(12) United States Patent
Tang et al.

(10) Patent No.: US 9,104,012 B2
(45) Date of Patent: Aug. 11, 2015

(54) IMAGE LENS ASSEMBLY, IMAGE CAPTURING DEVICE AND MOBILE TERMINAL

(71) Applicant: LARGAN PRECISION CO., LTD., Taichung (TW)

(72) Inventors: Hsiang-Chi Tang, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/084,617

(22) Filed: Nov. 20, 2013

(65) Prior Publication Data

US 2015/0124149 A1    May 7, 2015

(30) Foreign Application Priority Data

Nov. 1, 2013   (TW) .............................. 102139797 A

(51) Int. Cl.
| | |
|---|---|
| G02B 13/18 | (2006.01) |
| G02B 9/34 | (2006.01) |
| G02B 13/00 | (2006.01) |
| H04N 5/225 | (2006.01) |

(52) U.S. Cl.
CPC ............ *G02B 13/004* (2013.01); *H04N 5/2254* (2013.01); *G02B 9/34* (2013.01); *G02B 13/0015* (2013.01); *G02B 13/18* (2013.01)

(58) Field of Classification Search
CPC ........ G02B 13/004; G02B 13/18; G02B 9/34; G02B 13/0015

USPC .......................... 359/715, 739, 740, 747, 773
See application file for complete search history.

(56) References Cited

U.S. PATENT DOCUMENTS

| | | | |
|---|---|---|---|
| 2012/0062782 A1 | 3/2012 | Huang | |
| 2012/0086848 A1 | 4/2012 | Tsai et al. | |
| 2013/0003194 A1* | 1/2013 | Suzuki et al. | 359/715 |
| 2013/0044379 A1* | 2/2013 | Hsieh et al. | 359/715 |
| 2013/0070347 A1* | 3/2013 | Tang et al. | 359/715 |
| 2013/0188264 A1* | 7/2013 | Hashimoto | 359/715 |
| 2014/0022651 A1 | 1/2014 | Chen et al. | |
| 2014/0055870 A1 | 2/2014 | Chang et al. | |
| 2014/0132829 A1 | 5/2014 | Chen et al. | |

(Continued)

FOREIGN PATENT DOCUMENTS

| | | |
|---|---|---|
| JP | 2002-82271 A | 3/2002 |
| TW | 201305594 A | 2/2013 |

(Continued)

*Primary Examiner* — Evelyn A Lester

(74) *Attorney, Agent, or Firm* — CKC & Partners Co., Ltd.

(57) ABSTRACT

An image lens assembly includes, in order from an object side to an image side, a first lens element, a second lens element, a third lens element and a fourth lens element. The first lens element with positive refractive power has a convex object-side surface in a paraxial region thereof. The second lens element with negative refractive power has a concave object-side surface in a paraxial region thereof and a concave image-side surface in a paraxial region thereof. The third lens element with positive refractive power has a concave object-side surface in a paraxial region thereof and a convex image-side surface in a paraxial region thereof. The fourth lens element with negative refractive power has a concave image-side surface in a paraxial region thereof. The image lens assembly has a total of four lens elements with refractive power.

27 Claims, 22 Drawing Sheets

(56) References Cited

U.S. PATENT DOCUMENTS

2014/0185151 A1* 7/2014 Chen et al. ............ 359/773
2015/0009581 A1* 1/2015 Chen ..................... 359/715

FOREIGN PATENT DOCUMENTS

| TW | 201317613 A | 5/2013 |
|----|-------------|--------|
| TW | 201317657 A | 5/2013 |

* cited by examiner

IMAGE LENS ASSEMBLY, IMAGE CAPTURING DEVICE AND MOBILE TERMINAL

RELATED APPLICATIONS

This application claims priority to Taiwan Application Serial Number 102139797, filed Nov. 1, 2013, which is incorporated by reference herein in its entirety.

BACKGROUND

1. Technical Field

The present disclosure relates to an image lens assembly. More particularly, the present disclosure relates to a compact image lens assembly applicable to a mobile terminal.

2. Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional compact optical system in a portable electronic product typically utilizes a three-element lens structure. Due to the popularity of mobile products with high-end specifications, such as smart phones, tablet personal computers, wearable apparatus and other high-end mobile terminals, the requirements for high resolution and image quality of present compact optical systems increase significantly. However, the conventional optical systems cannot satisfy these requirements of the compact optical systems.

Another conventional compact optical system provides a four-element lens structure. However, the thicknesses of the second lens element and the third lens element are not even, so that it is not favorable for reducing the photosensitivity of the image lens assembly. Furthermore, it is also not favorable for keeping the image lens assembly compact which results in worse image quality and being applied to compact electronic products.

SUMMARY

According to one aspect of the present disclosure, an image lens assembly includes, in order from an object side to an image side, a first lens element, a second lens element, a third lens element and a fourth lens element. The first lens element with positive refractive power has an object-side surface being convex in a paraxial region thereof. The second lens element with negative refractive power has an object-side surface being concave in a paraxial region thereof and an image-side surface being concave in a paraxial region thereof, wherein at least one of the object-side surface and the image-side surface of the second lens element is aspheric. The third lens element with positive refractive power has an object-side surface being concave in a paraxial region thereof and an image-side surface being convex in a paraxial region thereof, wherein at least one of the object-side surface and the image-side surface of the third lens element is aspheric. The fourth lens element with negative refractive power has an image-side surface being concave in a paraxial region thereof, wherein both of an object-side surface and the image-side surface of the fourth lens element are aspheric, and the image-side surface of the fourth lens element has at least one inflection point. The image lens assembly has a total of four lens elements with refractive power, wherein any two lens elements of the image lens assembly adjacent to each other have a space between the two lens elements. When a central thickness of the second lens element is CT2, a central thickness of the third lens element is CT3, a curvature radius of the object-side surface of the second lens element is R3, a curvature radius of the image-side surface of the second lens element is R4, a focal length of the second lens element is f2, and a focal length of the fourth lens element is f4, the following conditions are satisfied:

$$0.50 < CT3/CT2 < 1.12;$$

$$-0.85 < (R3+R4)/(R3-R4) < 0.90; \text{ and}$$

$$0 < f4/f2 < 0.90.$$

According to another aspect of the present disclosure, an image capturing device includes the image lens assembly according to the aforementioned aspect and an image sensor, wherein the image sensor is connected to an image plane of the image lens assembly.

According to still another aspect of the present disclosure, a mobile terminal includes the image capturing device according to the aforementioned aspect.

According to yet another aspect of the present disclosure, an image lens assembly includes, in order from an object side to an image side, a first lens element, a second lens element, a third lens element and a fourth lens element. The first lens element with positive refractive power has an object-side surface being convex in a paraxial region thereof. The second lens element with negative refractive power is made of plastic material and has an object-side surface being concave in a paraxial region thereof, wherein at least one of an object-side surface and the image-side surface of the second lens element is aspheric. The third lens element with positive refractive power is made of plastic material and has an object-side surface being concave in a paraxial region thereof and an image-side surface being convex in a paraxial region thereof, wherein at least one of the object-side surface and the image-side surface of the third lens element is aspheric. The fourth lens element with negative refractive power is made of plastic material and has an image-side surface being concave in a paraxial region thereof, wherein both of an object-side surface and the image-side surface of the fourth lens element are aspheric, and the image-side surface of the fourth lens element has at least one inflection point. The image lens assembly has a total of four lens elements with refractive power, wherein any two lens elements of the image lens assembly adjacent to each other have a space between the two lens elements. The image lens assembly further includes a stop disposed between an imaged object and the first lens element. When a central thickness of the second lens element is CT2, a central thickness of the third lens element is CT3, a curvature radius of the object-side surface of the second lens element is R3, a curvature radius of the image-side surface of the second lens element is R4, a focal length of the second lens element is f2, a focal length of the fourth lens element is f4, a curvature radius of the object-side surface of the fourth lens element is R7, and a curvature radius of the image-side surface of the fourth lens element is R8, the following conditions are satisfied:

$$0.50 < CT3/CT2 < 1.12;$$

$$-1.50 < (R3+R4)/(R3-R4) < 0.90;$$

$$0 < f4/f2 < 0.90; \text{ and}$$

$$0 < (R7+R8)/(R7-R8) < 3.5.$$

According to still yet another aspect of the present disclosure, an image capturing device includes the image lens assembly according to the aforementioned aspect and an image sensor, wherein the image sensor is connected to an image plane of the image lens assembly.

According to a further aspect of the present disclosure, a mobile terminal includes the image capturing device according to the aforementioned aspect.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
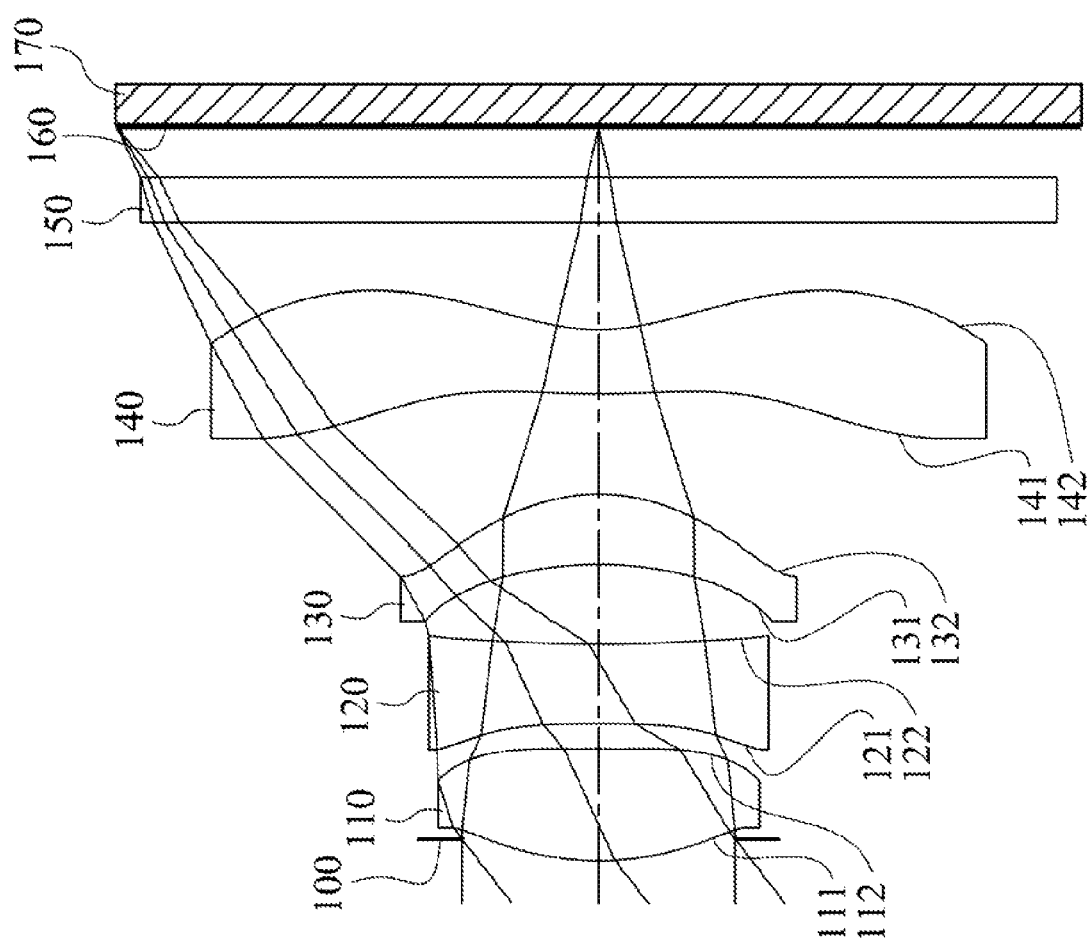
FIG. 1 is a schematic view of an image capturing device according to the 1st embodiment of the present disclosure.

An image lens assembly includes, in order from an object side to an image side, a first lens element, a second lens element, a third lens element and a fourth lens element. The image lens assembly has a total of four lens elements with refractive power.

Each of the first through fourth lens elements is a single and non-cemented lens element. That is, any two lens elements adjacent to each other are not cemented, and there is a space between the two lens elements. Moreover, the manufacturing process of the cemented lenses is more complex than the non-cemented lenses. In particular, a second surface of one lens and a first surface of the following lens need to have accurate curvature to ensure these two lens elements will be highly cemented. However, during the cementing process, those two lens elements might not be highly cemented due to displacement and it is thereby not favorable for the image quality of the image lens assembly. Therefore, the image lens assembly of the present disclosure provides four non-cemented lens elements for improving the problem generated by the cemented lens elements.

The first lens element with positive refractive power has an object-side surface being convex in a paraxial region thereof, so that it is favorable for adjusting the positive refractive power of the first lens element so as to reduce the total track length of the image lens assembly.

The second lens element with negative refractive power has an object-side surface being concave in a paraxial region thereof and an image-side surface being concave in a paraxial region thereof, so that it is favorable for correcting the aberration of the image lens assembly.

The third lens element with positive refractive power has an object-side surface being concave in a paraxial region thereof and an image-side surface being convex in a paraxial region thereof. Therefore, it is favorable for balancing the refractive powers of the image lens assembly so as to reduce photosensitivity and correct astigmatism.

The fourth lens element with negative refractive power has an image-side surface being concave in a paraxial region thereof, wherein the image-side surface of the fourth lens element has at least one inflection point. Therefore, the principal point of the image lens assembly can be positioned away from the image plane; it is thereby favorable for reducing the back focal length so as to maintain a compact size. It is also favorable for reducing the incident angle of the light projecting onto an image sensor so as to improve the responding efficiency of the image sensor.

When a central thickness of the second lens element is CT2, and a central thickness of the third lens element is CT3, the following condition is satisfied: $0.50<CT3/CT2<1.12$. Therefore, the thicknesses of the second lens element and the third lens element will be more even; therefore, it is favorable for reducing the photosensitivity of the image lens assembly so as to maintain a compact size. Preferably, the following condition is satisfied: $0.65<CT3/CT2<1.05$.

When a curvature radius of the object-side surface of the second lens element is R3, and a curvature radius of the image-side surface of the second lens element is R4, the following condition is satisfied: $-1.50<(R3+R4)/(R3-R4)<0.90$. Therefore, it is favorable for correcting aberration of the image lens assembly. Preferably, the following condition is satisfied: $-1.10 \leq (R3+R4)/(R3-R4)<0.90$. More preferably, the following condition is satisfied: $-0.85<(R3+R4)/(R3-R4)<0.90$. Much more preferably, the following condition is satisfied: $-0.60<(R3+R4)/(R3-R4)<0.45$.

When a focal length of the second lens element is f2, and a focal length of the fourth lens element is f4, the following condition is satisfied: $0<f4/f2<0.90$. Therefore, it is favorable for correcting aberration of the image lens assembly so as to keep the image lens assembly compact. Preferably, the following condition is satisfied: $0.20<f4/f2<0.75$.

The aforementioned image lens assembly can further include a stop, such as an aperture stop, which is disposed between an imaged object and the first lens element, wherein an axial distance between the stop and the image-side surface of the fourth lens element is SD, and an axial distance between the object-side surface of the first lens element and the image-side surface of the fourth lens element is TD, the following condition is satisfied: $0.85<SD/TD<1.15$. Therefore, it is favorable for reinforcing the telecentric effect of the image lens assembly.

When an axial distance between the first lens element and the second lens element is T12, and an axial distance between the second lens element and the third lens element is T23, the following condition is satisfied: $1.0<T23/T12<5.0$. Therefore, it is favorable for properly adjusting the axial distance between each lens element so as to increase the manufacturing yield rate.

When a maximal field of view of the image lens assembly is FOV, and the following condition is satisfied: 70 degrees<FOV<110 degrees. Therefore, it is favorable for obtaining enough field of view.

When a curvature radius of the object-side surface of the first lens element is R1, and a curvature radius of the image-side surface of the first lens element is R2, the following condition is satisfied: $-1.5<(R1+R2)(R1-R2)<0$. Therefore, it is favorable for reducing spherical aberration and astigmatism.

When a curvature radius of the object-side surface of the fourth lens element is R7, and a curvature radius of the image-side surface of the fourth lens element is R8, the following condition is satisfied: $0<(R7+R8)/(R7-R8)<3.5$. Therefore, it is favorable for further correcting aberration so as to maintain a compact size. Preferably, the following condition is satisfied: $1.0 \leq (R7+R8)/(R7-R8)<3.0$.

When a distance in parallel with an optical axis from an axial vertex on the object-side surface of the second lens element to a maximum effective radius position on the object-side surface of the second lens element is Sag21, and a distance in parallel with an optical axis from an axial vertex on the image-side surface of the second lens element to a maximum effective radius position on the image-side surface of the second lens element is Sag22 (Sag21 is negative when the distance towards the object side of the image lens assembly, and Sag21 is positive when the distance towards the image side of the image lens assembly), the following condition is satisfied: $-1.0<|Sag22|/Sag21<0$. Therefore, it is favorable for reducing the incident angle of the light projecting onto an image sensor so as to improve image quality.

When a refractive index of the second lens element is N2, and the following condition is satisfied: $1.58<N2<1.65$. Therefore, it is favorable for reducing aberration.

According to the image lens assembly of the present disclosure, the lens elements thereof can be made of glass or plastic material. When the lens elements are made of glass material, the distribution of the refractive power of the image lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the image lens assembly can also be reduced.

According to the image lens assembly of the present disclosure, each of an object-side surface in a paraxial region thereof and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the image lens assembly of the present disclosure, the image lens assembly can include at least one stop, such as an aperture stop, a glare stop or a field stop. Said glare stop or said field stop is for eliminating the stray light and thereby improving the image resolution thereof.

According to the image lens assembly of the present disclosure, an aperture stop can be configured as a front stop or a middle stop. A front stop disposed between an imaged object and the first lens element can provide a longer distance between an exit pupil of the image lens assembly and the image plane and thereby improves the image-sensing efficiency of an image sensor. A middle stop disposed between the first lens element and the image plane is favorable for enlarging the field of view of the image lens assembly and thereby provides a wider field of view for the same.

The present image lens assembly can be optionally applied to moving focus optical systems. According to the image lens assembly of the present disclosure, the image lens assembly is featured with good correction ability and high image quality, and can be applied to 3D (three-dimensional) image capturing applications, in products such as digital cameras, mobile devices, digital tablets, wearable devices and other mobile terminals.

According to the present disclosure, an image capturing device is provided. The image capturing device includes the image lens assembly according to the aforementioned image lens assembly of the present disclosure, and an image sensor, wherein the image sensor is disposed on an image plane of the aforementioned image lens assembly. In the image capturing device, the thicknesses of the second lens element and the third lens element is more even, so that it is favorable for reducing the photosensitivity of the image lens assembly so as to maintain a compact size. It is thereby favorable for being applied to compact electronic device. Preferably, the image capturing device can further include a barrel member, a holding member or a combination thereof.

According to the present disclosure, a mobile terminal is provided, wherein the mobile terminal includes the aforementioned image capturing device. In the image capturing device, the thicknesses of the second lens element and the third lens element is more even, so that it is favorable for reducing the photosensitivity of the image lens assembly so as to maintain a compact size. It is thereby favorable for being applied to compact electronic device. Preferably, the mobile terminal can further include but not limited to display, control unit, random access memory unit (RAM), storage unit or a combination thereof.

According to the above description of the present disclosure, the following 1st-9th specific embodiments are provided for further explanation.

1st Embodiment

Figure 2:
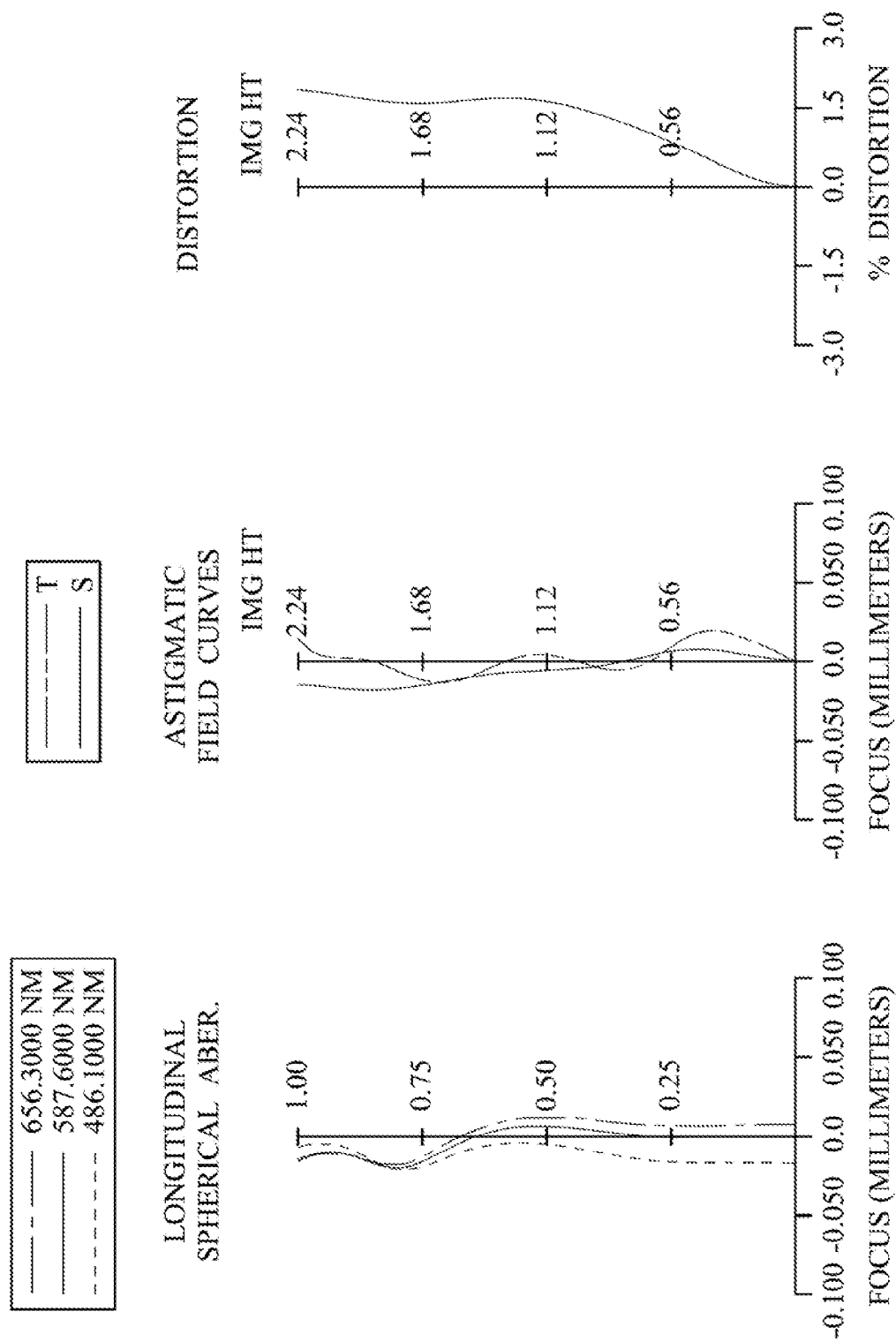
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows, in order from left to right, spherical aberration curves, astigmatic field curves and a distortion curve of the image capturing device according to the 1st embodiment.

In FIG. 1, the image capturing device includes the image lens assembly (not otherwise herein labeled) of the present disclosure and an image sensor 170. The image lens assembly includes, in order from an object side to an image side, an aperture stop 100, a first lens element 110, a second lens element 120, a third lens element 130, a fourth lens element 140, an IR-cut filter 150 and an image plane 160, wherein the image lens assembly has a total of four lens elements (110-140) with refractive power, and any two lens elements of the image lens assembly adjacent to each other have a space between the two lens elements.

The first lens element 110 with positive refractive power has an object-side surface 111 being convex in a paraxial region thereof and an image-side surface 112 being concave in a paraxial region thereof, which are both aspheric, and the first lens element 110 is made of plastic material.

The second lens element 120 with negative refractive power has an object-side surface 121 being concave in a paraxial region thereof and an image-side surface 122 being concave in a paraxial region thereof, which are both aspheric, and the second lens element 120 is made of plastic material.

The third lens element 130 with positive refractive power has an object-side surface 131 being concave in a paraxial region thereof and an image-side surface 132 being convex in a paraxial region thereof, which are both aspheric, and the third lens element 130 is made of plastic material.

The fourth lens element 140 with negative refractive power has an object-side surface 141 being convex in a paraxial region thereof and an image-side surface 142 being concave in a paraxial region thereof, which are both aspheric, and the fourth lens element 140 is made of plastic material. Furthermore, the image-side surface 142 of the fourth lens element 140 has at least one inflection point.

The IR-cut filter 150 is made of glass and located between the fourth lens element 140 and the image plane 160, and will not affect the focal length of the image lens assembly. The image sensor 170 is disposed on the image plane 160 of the image lens assembly.

The equation of the aspheric surface profiles of the aforementioned lens elements of the 1st embodiment is expressed as follows:

$$X(Y) = (Y^2/R)/(1+sqrt(1-(1+k)\times(Y/R)^2)) + \sum_i (Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image lens assembly of the image capturing device according to the 1st embodiment, when a focal length of the image lens assembly is f, an f-number of the image lens assembly is Fno, and half of a maximal field of view of the image lens assembly is HFOV, these parameters have the following values: f=2.86 mm; Fno=2.25; and HFOV=37.7 degrees.

In the image lens assembly of the image capturing device according to the 1st embodiment, when a refractive index of the second lens element 120 is N2, and the following condition is satisfied: N2=1.640.

In the image lens assembly according to the 1st embodiment, when a central thickness of the second lens element 120 is CT2, and a central thickness of the third lens element 130 is CT3, the following condition is satisfied: CT3/CT2=0.89.

In the image lens assembly of the image capturing device according to the 1st embodiment, when an axial distance between the first lens element 110 and the second lens element 120 is T12, and an axial distance between the second lens element 120 and the third lens element 130 is T23, the following condition is satisfied: T231/T12=3.16.

Figure 19:
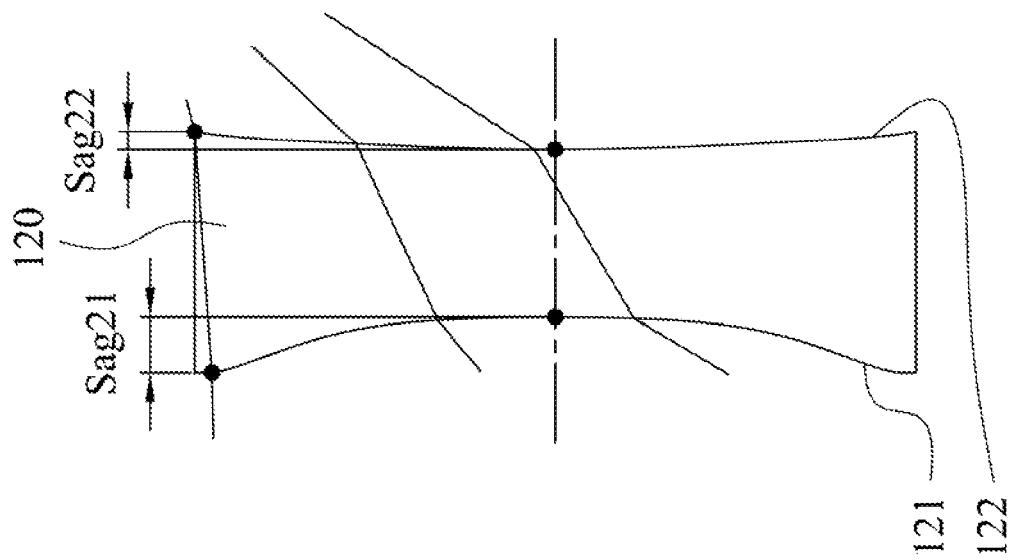
FIG. 19 shows Sag21 and Sag22 of the image lens assembly according to the 1st embodiment.

FIG. 19 shows Sag21 and Sag22 of the image lens assembly according to FIG. 1. In FIG. 19, when a distance in parallel with an optical axis from an axial vertex on the object-side surface 121 of the second lens element 120 to a maximum effective radius position on the object-side surface 121 of the second lens element 120 is Sag21, and a distance in parallel with an optical axis from an axial vertex on the image-side surface 122 of the second lens element 120 to a maximum effective radius position on the image-side surface 122 of the second lens element 120 is Sag22, the following condition is satisfied: |Sag22|/Sag21=−0.33.

In the image lens assembly according to the 1st embodiment, when a curvature radius of the object-side surface 111 of the first lens element 110 is R1, a curvature radius of the image-side surface 112 of the first lens element 110 is R2, a curvature radius of the object-side surface 121 of the second lens element 120 is R3, a curvature radius of the image-side surface 122 of the second lens element 120 is R4, a curvature radius of the object-side surface 141 of the fourth lens element 140 is R7, and a curvature radius of the image-side surface 142 of the fourth lens element 140 is R8, the following conditions are satisfied: (R1+R2)/(R1−R2)=−1.01; (R3+R4)/(R3−R4)=0.01; and (R7+R8)(R7−R8)=1.62.

In the image lens assembly according to the 1st embodiment, when a focal length of the second lens element 120 is f2, and a focal length of the fourth lens element 140 is f4, the following condition is satisfied: f4/f2=0.45.

In the image lens assembly according to the 1st embodiment, when an axial distance between an aperture stop 100 and the image-side surface 142 of the fourth lens element 140 is SD, and an axial distance between the object-side surface 111 of the first lens element 110 and the image-side surface 142 of the fourth lens element 140 is TD, the following condition is satisfied: SD/TD=0.96.

In the image lens assembly of the image capturing device according to the 1st embodiment, when a maximal field of view of the image lens assembly is FOV, and the following condition is satisfied: FOV=75.4 degrees.

The detailed optical data of the 1st embodiment are shown in Table 1 and the aspheric surface data are shown in Table 2 below.

TABLE 1

Embodiment 1
f = 2.86 Fno = 2.25, HFOV = 37.7 deg,

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.101 | | | | |
| 2 | Lens 1 | 1.332 | ASP | 0.520 | Plastic | 1.544 | 55.9 | 2.46 |
| 3 | | 221.659 | ASP | 0.118 | | | | |
| 4 | Lens 2 | −6.924 | ASP | 0.367 | Plastic | 1.640 | 23.3 | −5.32 |
| 5 | | 6.837 | ASP | 0.373 | | | | |
| 6 | Lens 3 | −1.685 | ASP | 0.327 | Plastic | 1.544 | 55.9 | 2.62 |
| 7 | | −0.824 | ASP | 0.464 | | | | |
| 8 | Lens 4 | 4.003 | ASP | 0.301 | Plastic | 1.544 | 55.9 | −2.38 |
| 9 | | 0.953 | ASP | 0.500 | | | | |
| 10 | IR-cut filter | Plano | | 0.210 | Glass | 1.517 | 64.2 | — |
| 11 | | Plano | | 0.237 | | | | |
| 12 | Image | Plano | | — | | | | |

Note:
Reference wavelength is 587.6 nm (d-line).

TABLE 2

Aspheric Coefficients

| Surface # | | | | |
|---|---|---|---|---|
| | 2 | 3 | 4 | 5 |
| k = | −8.6890E−01 | −8.9999E+01 | −6.8458E+01 | 5.5303E+01 |
| A4 = | 4.3910E−02 | −2.5320E−01 | −3.3479E−01 | −2.6259E−02 |
| A6 = | −3.8040E−01 | −5.9623E−01 | −3.7789E−01 | −2.1465E−01 |
| A8 = | 1.3458E+00 | 6.7310E−01 | 1.2012E−01 | 3.1374E−01 |
| A10 = | −2.5468E+00 | −5.8332E−01 | 2.0032E+00 | −1.1221E−01 |
| A12 = | | | −1.1766E+00 | 7.9550E−02 |

| Surface # | | | | |
|---|---|---|---|---|
| | 6 | 7 | 8 | 9 |
| k = | 2.8299E+00 | −2.6666E+00 | 2.5000E+00 | −5.0759E+00 |
| A4 = | 1.5930E−01 | −8.0285E−02 | −3.8713E−01 | −2.3652E−01 |
| A6 = | −2.1527E−01 | −8.9295E−01 | 2.0065E−01 | 1.6247E−01 |
| A8 = | −2.6635E−01 | 4.6881E+00 | −1.5948E−03 | −8.2849E−02 |
| A10 = | 4.0907E−01 | −1.2938E+01 | −3.8876E−02 | 2.7500E−02 |
| A12 = | 1.3282E+00 | 1.9129E+01 | 1.6849E−02 | −5.4310E−03 |
| A14 = | −2.6197E+00 | −1.3273E+01 | −3.0733E−03 | 5.1898E−04 |
| A16 = | 1.2826E+00 | 3.4166E+00 | 2.1475E−04 | −1.1954E−05 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
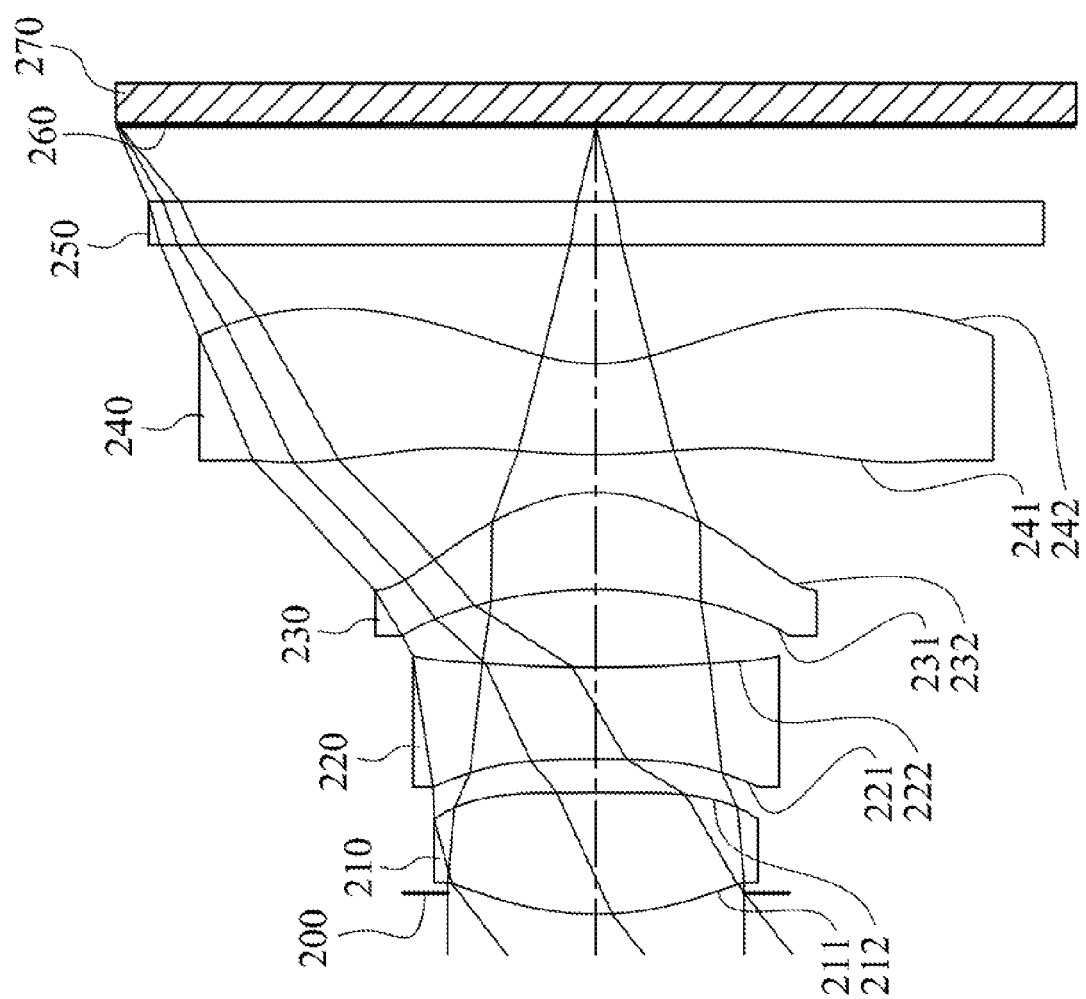
FIG. 3 is a schematic view of an image capturing device according to the 2nd embodiment of the present disclosure.
Figure 4:
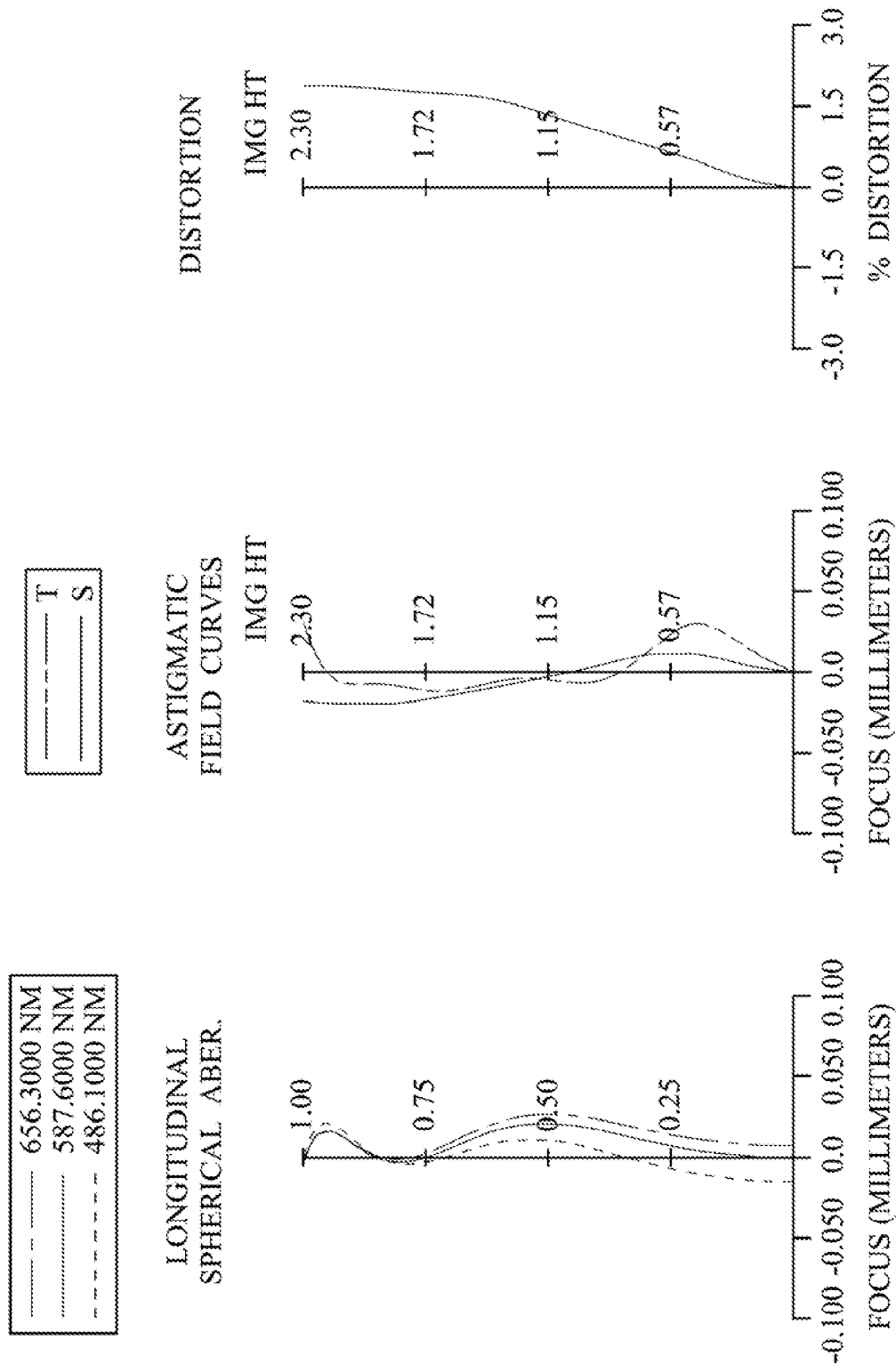
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows, in order from left to right, spherical aberration curves, astigmatic field curves and a distortion curve of the image capturing device according to the 2nd embodiment.

In FIG. 3, the image capturing device includes the image lens assembly (not otherwise herein labeled) of the present disclosure and an image sensor 270. The image lens assembly includes, in order from an object side to an image side, an aperture stop 200, a first lens element 210, a second lens element 220, a third lens element 230, a fourth lens element 240, an IR-cut filter 250 and an image plane 260, wherein the image lens assembly has a total of four lens elements (210-240) with refractive power, and any two lens elements of the image lens assembly adjacent to each other have a space between the two lens elements.

The first lens element 210 with positive refractive power has an object-side surface 211 being convex in a paraxial region thereof and an image-side surface 212 being convex in a paraxial region thereof, which are both aspheric, and the first lens element 210 is made of plastic material.

The second lens element 220 with negative refractive power has an object-side surface 221 being concave in a paraxial region thereof and an image-side surface 222 being concave in a paraxial region thereof, which are both aspheric, and the second lens element 220 is made of plastic material.

The third lens element 230 with positive refractive power has an object-side surface 231 being concave in a paraxial region thereof and an image-side surface 232 being convex in a paraxial region thereof, which are both aspheric, and the third lens element 230 is made of plastic material.

The fourth lens element 240 with negative refractive power has an object-side surface 241 being convex in a paraxial region thereof and an image-side surface 242 being concave in a paraxial region thereof, which are both aspheric, and the fourth lens element 240 is made of plastic material. Furthermore, the image-side surface 242 of the fourth lens element 240 has at least one inflection point.

The IR-cut filter 250 is made of glass and located between the fourth lens element 240 and the image plane 260, and will not affect the focal length of the image lens assembly. The image sensor 270 is disposed on the image plane 260 of the image lens assembly.

The detailed optical data of the 2nd embodiment are shown in Table 3 and the aspheric surface data are shown in Table 4 below.

TABLE 3

Embodiment 2
f = 2.92 Fno = 2.05, HFOV = 37.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.102 | | | | |
| 2 | Lens 1 | 1.519 | ASP | 0.583 | Plastic | 1.544 | 55.9 | 2.66 |
| 3 | | −27.664 | ASP | 0.160 | | | | |
| 4 | Lens 2 | −5.760 | ASP | 0.442 | Plastic | 1.640 | 23.3 | −5.22 |
| 5 | | 8.187 | ASP | 0.376 | | | | |
| 6 | Lens 3 | −1.991 | ASP | 0.465 | Plastic | 1.544 | 55.9 | 1.99 |
| 7 | | 0.760 | ASP | 0.183 | | | | |
| 8 | Lens 4 | 3.255 | ASP | 0.435 | Plastic | 1.544 | 55.9 | −2.10 |
| 9 | | 0.806 | ASP | 0.570 | | | | |
| 10 | IR-cut filter | Plano | | 0.210 | Glass | 1.517 | 64.2 | — |
| 11 | | Plano | | 0.369 | | | | |
| 12 | Image | Plano | | — | | | | |

Note:
Reference wavelength is 587.6 nm (d-line).
The effective radius of Surface 6 is 0.930 mm.

TABLE 4

Aspheric Coefficients

| Surface # | | | | |
|---|---|---|---|---|
| | 2 | 3 | 4 | 5 |
| k = | −7.9334E−01 | 2.9911E+01 | −7.1158E+01 | 7.5003E+01 |
| A4 = | 4.9179E−03 | −1.7031E−01 | −2.4406E−01 | 6.0673E−03 |
| A6 = | −1.5279E−01 | −3.7390E−01 | −2.8939E−01 | −1.6289E−01 |
| A8 = | 4.3184E−01 | 3.6557E−01 | 1.8042E−01 | 1.5912E−01 |
| A10 = | −8.1022E−01 | −2.4765E−01 | 7.6094E−01 | 1.5658E−02 |
| A12 = | | | −4.4523E−01 | −2.8719E−02 |

| Surface # | | | | |
|---|---|---|---|---|
| | 6 | 7 | 8 | 9 |
| k = | 2.8471E+00 | −2.6312E+00 | 1.5506E+00 | −5.1031E+00 |
| A4 = | 1.0955E−01 | −4.8821E−03 | −2.2561E−01 | −1.4816E−01 |
| A6 = | 5.9440E−01 | −4.0276E−01 | 3.7391E−02 | 8.9035E−02 |
| A8 = | 3.3823E+00 | 1.3262E+00 | 6.2801E−02 | −44284E−02 |
| A10 = | 8.2054E+00 | −2.6857E+00 | −4.2632E−02 | 1.5455E−02 |
| A12 = | −1.0903E+01 | 3.0667E+00 | 1.1439E−02 | −3.4796E−03 |
| A14 = | 7.8434E+00 | −1.6071E+00 | −1.3835E−03 | 4.4919E−04 |
| A16 = | −2.3544E+00 | 2.9502E−01 | 5.4656E−05 | −2.5098E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.92 | (R1 + R2)/(R1 − R2) | −0.90 |
| Fno | 2.05 | (R3 + R4)/(R3 − R4) | −0.17 |
| HFOV [deg.] | 37.7 | (R7 + R8)/(R7 − R8) | 1.66 |
| N2 | 1.640 | f4/f2 | 0.40 |
| CT3/CT2 | 1.05 | SD/TD | 0.96 |
| T23/T12 | 2.35 | FOV [deg.] | 75.4 |
| |Sag22|/Sag21 | −0.40 | | |

3rd Embodiment

Figure 5:
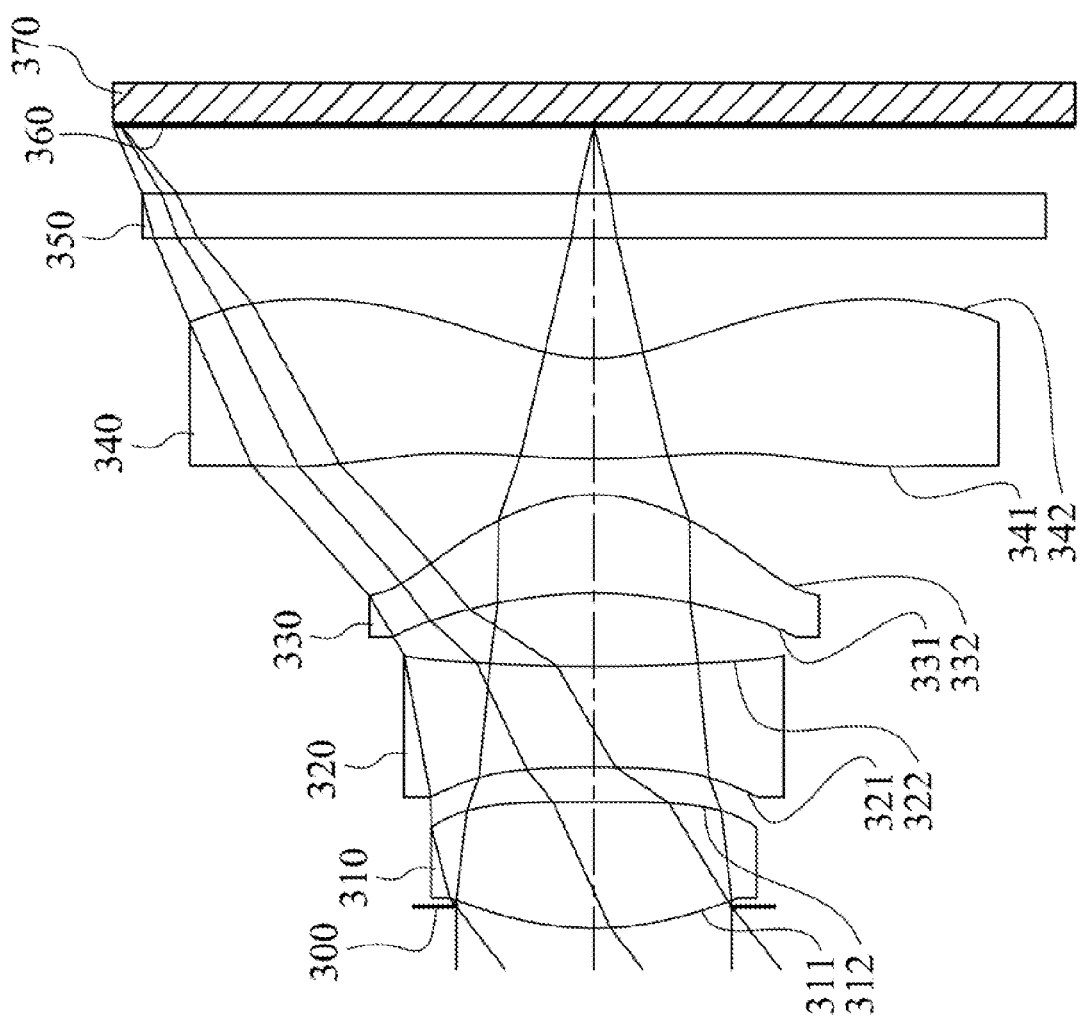
FIG. 5 is a schematic view of an image capturing device according to the 3rd embodiment of the present disclosure.
Figure 6:
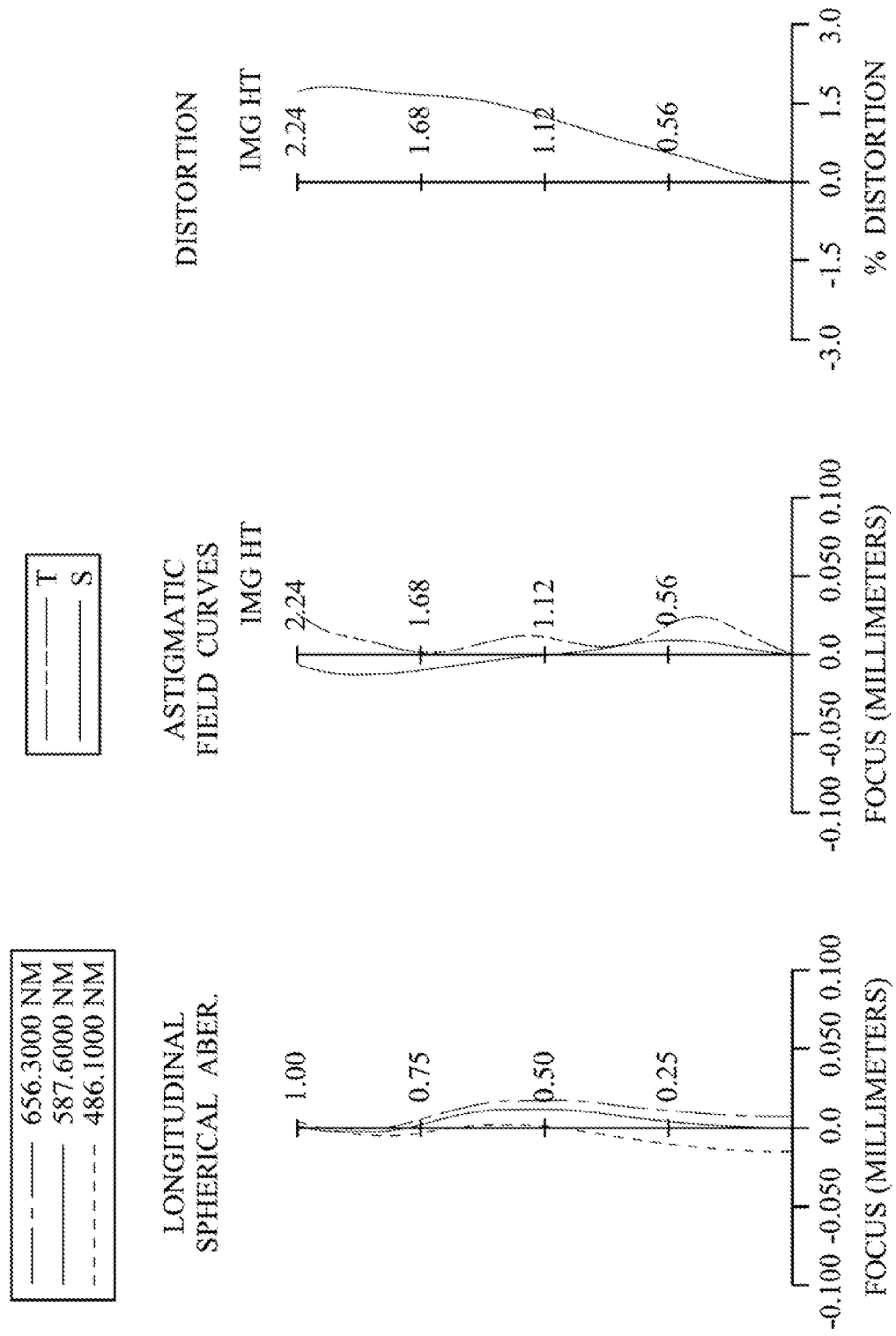
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows, in order from left to right, spherical aberration curves, astigmatic field curves and a distortion curve of the image capturing device according to the 3rd embodiment.

In FIG. 5, the image capturing device includes the image lens assembly (not otherwise herein labeled) of the present disclosure and an image sensor 370. The image lens assembly includes, in order from an object side to an image side, an aperture stop 300, a first lens element 310, a second lens element 320, a third lens element 330, a fourth lens element 340, an IR-cut filter 350 and an image plane 360, wherein the image lens assembly has a total of four lens elements (310-340) with refractive power, and any two lens elements of the image lens assembly adjacent to each other have a space between the two lens elements.

The first lens element 310 with positive refractive power has an object-side surface 311 being convex in a paraxial region thereof and an image-side surface 312 being convex in a paraxial region thereof, which are both aspheric, and the first lens element 310 is made of plastic material.

The second lens element 320 with negative refractive power has an object-side surface 321 being concave in a paraxial region thereof and an image-side surface 322 being concave in a paraxial region thereof, which are both aspheric, and the second lens element 320 is made of plastic material.

The third lens element 330 with positive refractive power has an object-side surface 331 being concave in a paraxial region thereof and an image-side surface 332 being convex in a paraxial region thereof, which are both aspheric, and the third lens element 330 is made of plastic material. The fourth lens element 340 with negative refractive power has an object-side surface 341 being convex in a paraxial region thereof and an image-side surface 342 being concave in a paraxial region thereof, which are both aspheric, and the fourth lens element 340 is made of plastic material. Furthermore, the image-side surface 342 of the fourth lens element 340 has at least one inflection point.

The IR-cut filter 350 is made of glass and located between the fourth lens element 340 and the image plane 360, and will not affect the focal length of the image lens assembly. The image sensor 370 is disposed on the image plane 360 of the image lens assembly.

The detailed optical data of the 3rd embodiment are shown in Table 5 and the aspheric surface data are shown in Table 6 below.

TABLE 5

Embodiment 3
f = 2.87 Fno = 2.20, HFOV = 37.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.102 | | | | |
| 2 | Lens 1 | 1.542 | ASP | 0.597 | Plastic | 1.544 | 55.9 | 2.72 |
| 3 | | −31.948 | ASP | 0.162 | | | | |
| 4 | Lens 2 | −5.814 | ASP | 0.477 | Plastic | 1.640 | 23.3 | −5.34 |
| 5 | | 8.565 | ASP | 0.349 | | | | |
| 6 | Lens 3 | −2.051 | ASP | 0.464 | Plastic | 1.544 | 55.9 | 1.94 |
| 7 | | −0.752 | ASP | 0.172 | | | | |
| 8 | Lens 4 | 3.750 | ASP | 0.475 | Plastic | 1.544 | 55.9 | −2.05 |
| 9 | | 0.821 | ASP | 0.570 | | | | |
| 10 | IR-cut filter | Plano | | 0.210 | Glass | 1.517 | 64.2 | — |
| 11 | | Plano | | 0.325 | | | | |
| 12 | Image | Plano | | — | | | | |

Note:
Reference wavelength is 587.6 nm (d-line).

TABLE 6

Aspheric Coefficients

| Surface # | 2 | 3 | 4 | 5 |
|---|---|---|---|---|
| k = | −7.4246E−01 | −9.0000E+01 | −4.9651E+01 | 7.5090E+01 |
| A4 = | 5.8551E−03 | −1.7881E−01 | −2.4765E−01 | 1.6231E−02 |
| A6 = | −1.3338E−01 | −3.5464E−01 | −2.9522E−01 | −1.7114E−01 |
| A8 = | 3.4010E−01 | 4.1631E−01 | 1.8002E−01 | 1.4967E−01 |
| A10 = | −6.6522E−01 | −3.6035E−01 | 7.9028E−01 | 2.0543E−03 |
| A12 = | | | −5.9526E−01 | −2.5445E−03 |

| Surface # | 6 | 7 | 8 | 9 |
|---|---|---|---|---|
| k = | 2.8103E+00 | −2.6297E+00 | 2.7343E+00 | −5.1033E+00 |
| A4 = | 1.2559E−01 | −2.8009E−02 | −1.7698E−01 | −1.2822E−01 |
| A6 = | 4.8169E−01 | −3.7695E−01 | −3.8755E−02 | 6.2314E−02 |
| A8 = | −2.7678E+00 | 1.4288E+00 | 1.3450E−01 | −2.1847E−02 |
| A10 = | 6.6159E+00 | −3.0614E+00 | −7.9556E−02 | 4.1612E−03 |
| A12 = | −8.6886E+00 | 3.6001E+00 | 2.1501E−02 | −6.6238E−05 |
| A14 = | 6.2097E+00 | −1.9538E+00 | −2.7049E−03 | −1.1771E−04 |
| A16 = | −1.8547E+00 | 3.7892E−01 | 1.1425E−04 | 1.3954E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.87 | (R1 + R2)/(R1 − R2) | −0.91 |
| Fno | 2.20 | (R3 + R4)/(R3 − R4) | −0.19 |
| HFOV [deg.] | 37.6 | (R7 + R8)/(R7 − R8) | 1.56 |
| N2 | 1.640 | f4/f2 | 0.38 |
| CT3/CT2 | 0.97 | SD/TD | 0.96 |
| T23/T12 | 2.15 | FOV [deg.] | 75.2 |
| |Sag22|/Sag21 | −0.37 | | |

4th Embodiment

Figure 7:
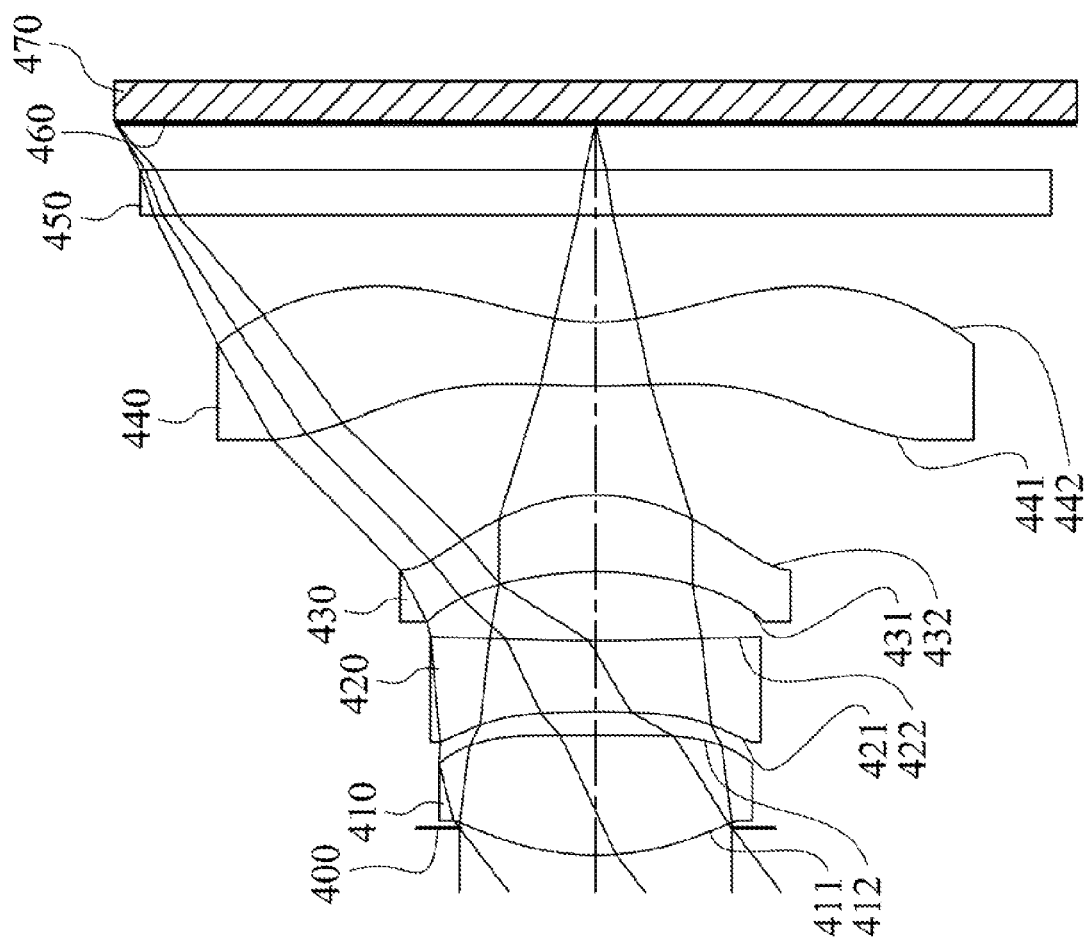
FIG. 7 is a schematic view of an image capturing device according to the 4th embodiment of the present disclosure.
Figure 8:
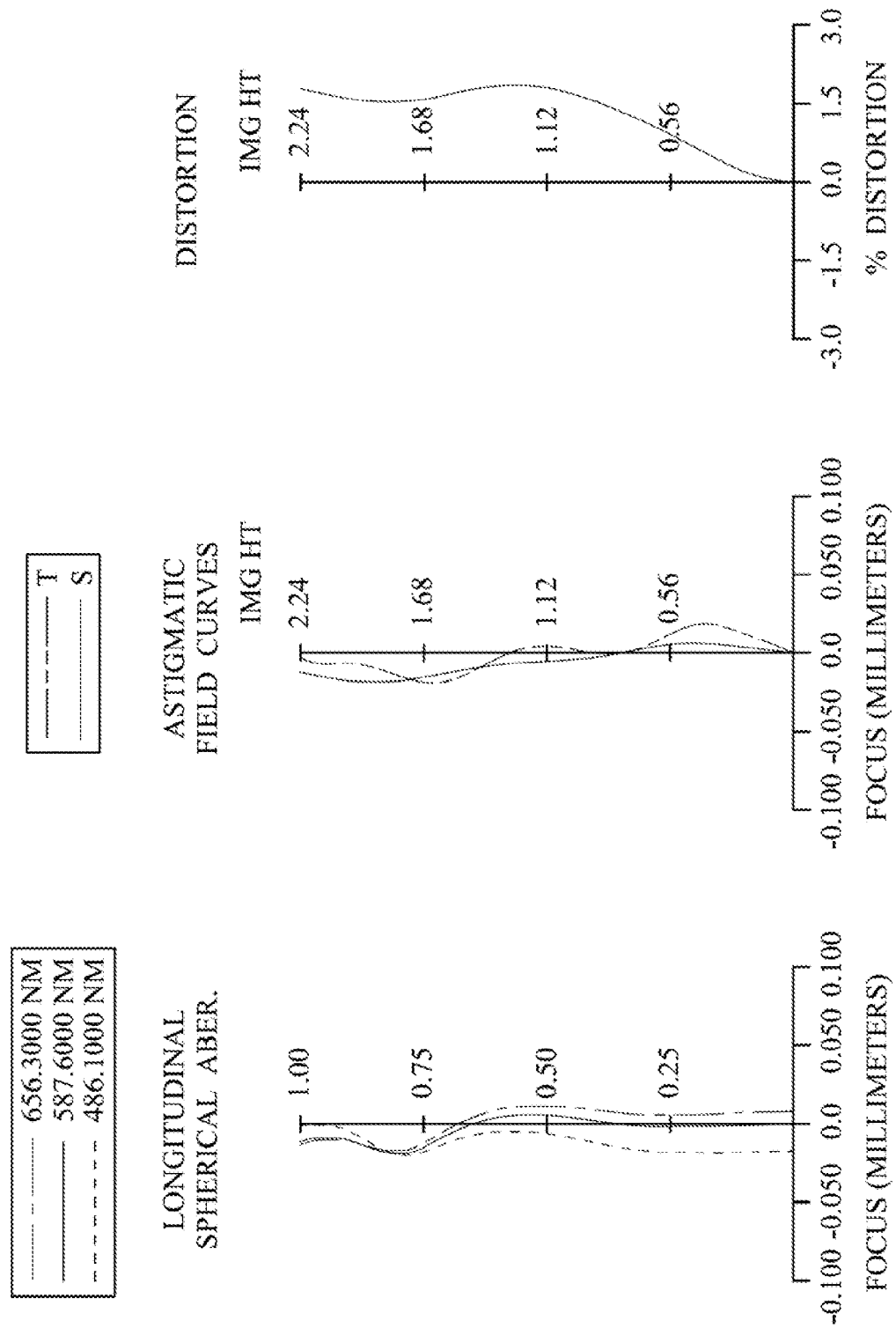
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows, in order from left to right, spherical aberration curves, astigmatic field curves and a distortion curve of the image capturing device according to the 4th embodiment.

In FIG. 7, the image capturing device includes the image lens assembly (not otherwise herein labeled) of the present disclosure and an image sensor 470. The image lens assembly includes, in order from an object side to an image side, an aperture stop 400, a first lens element 410, a second lens element 420, a third lens element 430, a fourth lens element 440, an IR-cut filter 450 and an image plane 460, wherein the image lens assembly has a total of four lens elements (410-440) with refractive power, and any two lens elements of the image lens assembly adjacent to each other have a space between the two lens elements.

The first lens element 410 with positive refractive power has an object-side surface 411 being convex in a paraxial region thereof and an image-side surface 412 being concave in a paraxial region thereof, which are both aspheric, and the first lens element 410 is made of plastic material.

The second lens element 420 with negative refractive power has an object-side surface 421 being concave in a paraxial region thereof and an image-side surface 422 being concave in a paraxial region thereof, which are both aspheric, and the second lens element 420 is made of plastic material.

The third lens element 430 with positive refractive power has an object-side surface 431 being concave in a paraxial region thereof and an image-side surface 432 being convex in a paraxial region thereof, which are both aspheric, and the third lens element 430 is made of plastic material.

The fourth lens element 440 with negative refractive power has an object-side surface 441 being convex in a paraxial region thereof and an image-side surface 442 being concave in a paraxial region thereof, which are both aspheric, and the fourth lens element 440 is made of plastic material. Furthermore, the image-side surface 442 of the fourth lens element 440 has at least one inflection point.

The IR-cut filter 450 is made of glass and located between the fourth lens element 440 and the image plane 460, and will not affect the focal length of the image lens assembly. The image sensor 470 is disposed on the image plane 460 of the image lens assembly.

The detailed optical data of the 4th embodiment are shown in Table 7 and the aspheric surface data are shown in Table 8 below.

TABLE 7

Embodiment 4
f = 2.86 Fno = 2.25, HFOV = 37.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.126 | | | | |
| 2 | Lens 1 | 1.303 | ASP | 0.559 | Plastic | 1.544 | 55.9 | 2.43 |
| 3 | | 70.605 | ASP | 0.110 | | | | |
| 4 | Lens 2 | −5.620 | ASP | 0.329 | Plastic | 1.640 | 23.3 | −5.47 |
| 5 | | 9.510 | ASP | 0.325 | | | | |
| 6 | Lens 3 | −1.632 | ASP | 0.356 | Plastic | 1.544 | 55.9 | 2.77 |
| 7 | | −0.844 | ASP | 0.509 | | | | |
| 8 | Lens 4 | 4.544 | ASP | 0.300 | Plastic | 1.544 | 55.9 | −2.47 |
| 9 | | 1.013 | ASP | 0.500 | | | | |
| 10 | IR-cut filter | Plano | | 0.210 | Glass | 1.517 | 64.2 | — |
| 11 | | Plano | | 0.221 | | | | |
| 12 | Image | Plano | | — | | | | |

Note:
Reference wavelength is 587.6 nm (d-line).

TABLE 8

Aspheric Coefficients

| Surface # | 2 | 3 | 4 | 5 |
|---|---|---|---|---|
| k = | −5.8901E−01 | −8.9999E+01 | −6.8458E+01 | 5.5303E+01 |
| A4 = | 4.5764E−02 | −2.3516E−01 | −3.4366E−01 | 4.2896E−02 |
| A6 = | −3.8703E−01 | −7.4819E−01 | −6.8774E−01 | −5.5317E−01 |
| A8 = | 1.4401E+00 | 6.9261E−01 | 5.5027E−01 | 1.1682E+00 |
| A10 = | −2.5125E+00 | −3.4858E−01 | 1.6438E+00 | −1.2688E+00 |
| A12 = | | | −7.2849E−01 | 7.5415E−01 |

| Surface # | 6 | 7 | 8 | 9 |
|---|---|---|---|---|
| k = | 2.8685E+00 | −2.8397E+00 | 1.5428E+00 | −5.0722E+00 |
| A4 = | 2.6161E−01 | −1.0152E−01 | −3.7849E−01 | −2.4718E−01 |
| A6 = | −5.9308E−01 | −6.8654E−01 | 1.7687E−01 | 1.7378E−01 |
| A8 = | 1.4025E+00 | 3.8350E+00 | 6.9189E−03 | −9.4553E−02 |
| A10 = | −3.5570E+00 | −1.0602E+01 | −3.2151E−02 | 3.3946E−02 |
| A12 = | 6.8595E+00 | 1.6124E+01 | 1.1843E−02 | −7.4485E−03 |
| A14 = | −6.7826E+00 | −1.1554E+01 | −1.8925E−03 | 8.5556E−04 |
| A16 = | 2.5435E+00 | 3.0585E+00 | 1.1776E−04 | −3.4037E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

4th Embodiment

| f [mm] | 2.86 | (R1 + R2)/(R1 − R2) | −1.04 |
|---|---|---|---|
| Fno | 2.25 | (R3 + R4)/(R3 − R4) | −0.26 |
| HFOV [deg.] | 37.7 | (R7 + R8)/(R7 − R8) | 1.57 |
| N2 | 1.640 | f4/f2 | 0.45 |
| CT3/CT2 | 1.08 | SD/TD | 0.95 |
| T23/T12 | 2.95 | FOV [deg.] | 75.4 |
| |Sag22|/Sag21 | −0.13 | | |

5th Embodiment

Figure 9:
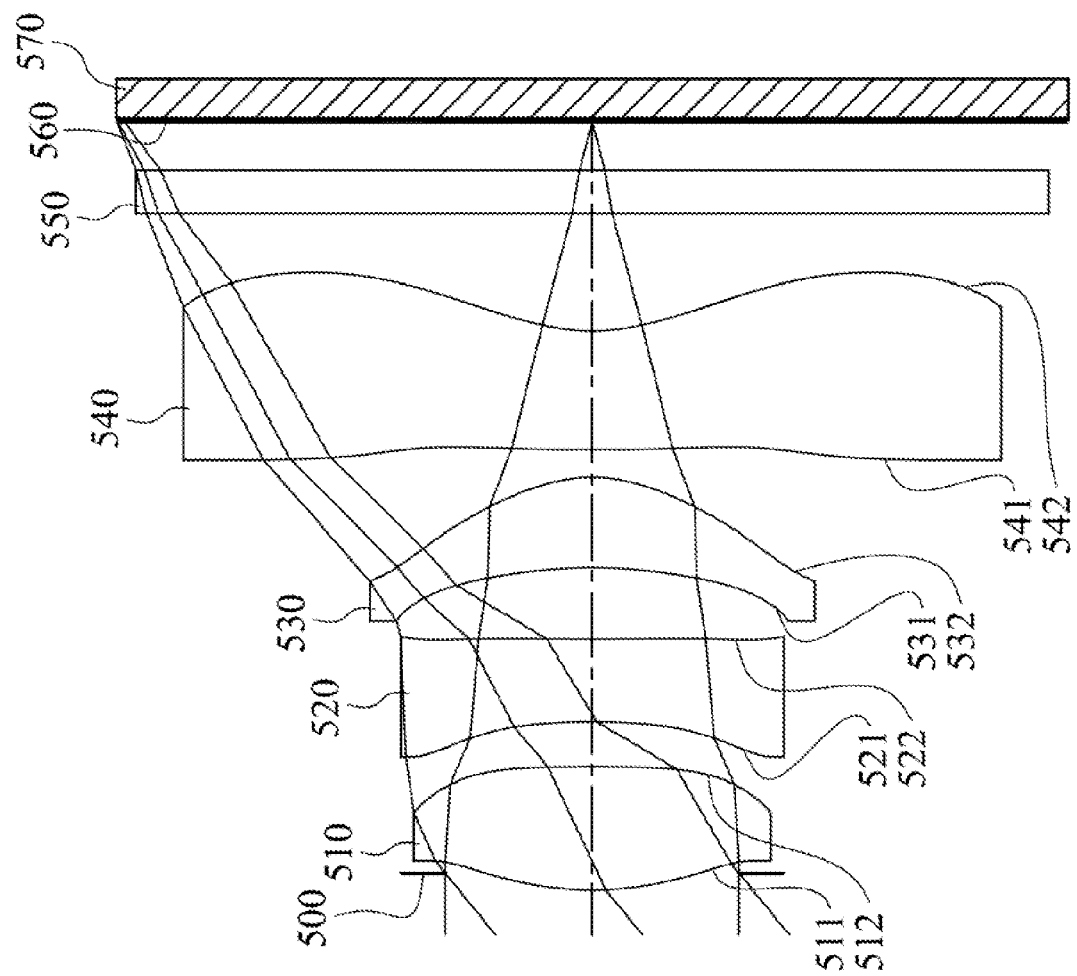
FIG. 9 is a schematic view of an image capturing device according to the 5th embodiment of the present disclosure.
Figure 10:
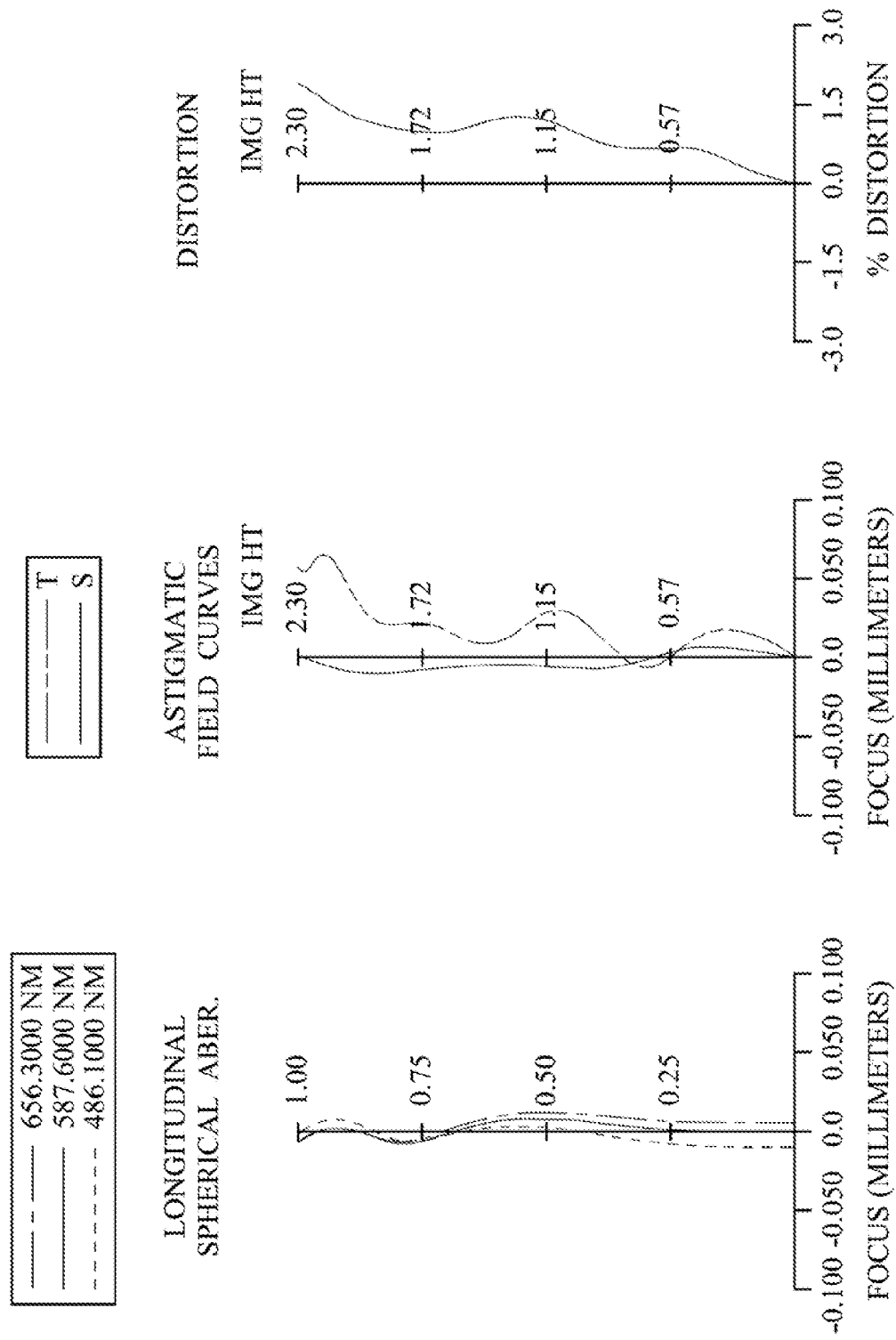
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows, in order from left to right, spherical aberration curves, astigmatic field curves and a distortion curve of the image capturing device according to the 5th embodiment.

In FIG. 9, the image capturing device includes the image lens assembly (not otherwise herein labeled) of the present disclosure and an image sensor 570. The image lens assembly includes, in order from an object side to an image side, an aperture stop 500, a first lens element 510, a second lens element 520, a third lens element 530, a fourth lens element 540, an IR-cut filter 550 and an image plane 560, wherein the image lens assembly has a total of four lens elements (510-540) with refractive power, and any two lens elements of the image lens assembly adjacent to each other have a space between the two lens elements.

The first lens element 510 with positive refractive power has an object-side surface 511 being convex in a paraxial region thereof and an image-side surface 512 being convex in a paraxial region thereof, which are both aspheric, and the first lens element 510 is made of glass material.

The second lens element 520 with negative refractive power has an object-side surface 521 being concave in a paraxial region thereof and an image-side surface 522 being concave in a paraxial region thereof, which are both aspheric, and the second lens element 520 is made of plastic material.

The third lens element 530 with positive refractive power has an object-side surface 531 being concave in a paraxial region thereof and an image-side surface 532 being convex in a paraxial region thereof, which are both aspheric, and the third lens element 530 is made of plastic material.

The fourth lens element 540 with negative refractive power has an object-side surface 541 being concave in a paraxial region thereof and an image-side surface 542 being concave in a paraxial region thereof, which are both aspheric, and the fourth lens element 540 is made of plastic material. Furthermore, the image-side surface 542 of the fourth lens element 540 has at least one inflection point.

The IR-cut filter 550 is made of glass and located between the fourth lens element 540 and the image plane 560, and will not affect the focal length of the image lens assembly. The image sensor 570 is disposed on the image plane 560 of the image lens assembly.

The detailed optical data of the 5th embodiment are shown in Table 9 and the aspheric surface data are shown in Table 10 below.

TABLE 9

Embodiment 5
f = 2.77 Fno = 1.95, HFOV = 39.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.081 | | | | |
| 2 | Lens 1 | 1.587 | ASP | 0.594 | Plastic | 1.542 | 62.9 | 2.62 |
| 3 | | −12.050 | ASP | 0.219 | | | | |
| 4 | Lens 2 | −3.687 | ASP | 0.398 | Plastic | 1.640 | 23.3 | −5.19 |
| 5 | | 35.120 | ASP | 0.349 | | | | |
| 6 | Lens 3 | −2.216 | ASP | 0.437 | Plastic | 1.544 | 55.9 | 1.71 |
| 7 | | −0.702 | ASP | 0.135 | | | | |
| 8 | Lens 4 | 100.000 | ASP | 0.573 | Plastic | 1.535 | 55.7 | −1.75 |
| 9 | | 0.947 | ASP | 0.570 | | | | |
| 10 | IR-cut filter | Plano | | 0.210 | Glass | 1.517 | 64.2 | — |
| 11 | | Plano | | 0.240 | | | | |
| 12 | Image | Plano | | — | | | | |

Note:
Reference wavelength is 587.6 nm (d-line).

TABLE 10

Aspheric Coefficients

| Surface # | 2 | 3 | 4 | 5 |
|---|---|---|---|---|
| k = | −8.9496E−01 | 7.2473E+01 | −4.5051E+00 | −9.0000E+01 |
| A4 = | −1.1910E−04 | −1.9010E−01 | −2.6825E−01 | −1.2370E−02 |
| A6 = | −2.0217E−01 | −2.8530E−01 | −2.0790E−01 | −1.4763E−01 |
| A8 = | 4.5184E−01 | 2.7023E−01 | 2.7225E−01 | 1.9924E−01 |
| A10 = | −8.3583E−01 | −2.0237E−01 | 7.4832E−01 | −2.0478E−02 |
| A12 = | | | −5.5723E−01 | 1.3390E−02 |

| Surface # | 6 | 7 | 8 | 9 |
|---|---|---|---|---|
| k = | 4.2894E+00 | −3.0012E+00 | 9.0000E+01 | −5.0839E+00 |
| A4 = | 1.2093E−01 | 1.7988E−02 | 3.4017E−01 | −8.7378E−02 |
| A6 = | 6.2588E−01 | −1.8487E−01 | −9.8093E−01 | 2.7175E−02 |
| A8 = | −2.4186E+00 | 7.8166E−01 | 1.1128E+00 | −1.8213E−02 |
| A10 = | 2.9549E+00 | −2.5730E+00 | −6.6841E−01 | 1.2927E−02 |
| A12 = | −5.8515E−01 | 3.7242E+00 | 2.2622E−01 | 4.9401E−03 |
| A14 = | −1.5203E+00 | −2.3287E+00 | −4.0810E−02 | 9.1622E−04 |
| A16 = | 9.4351E−01 | 5.3239E−01 | 3.0443E−03 | −6.6844E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table as the following values and satisfy the following conditions:

| 5th Embodiment | | | |
|---|---|---|---|
| f [mm] | 2.77 | (R1 + R2)/(R1 − R2) | −0.77 |
| Fno | 1.95 | (R3 + R4)/(R3 − R4) | −0.31 |
| HFOV [deg.] | 39.1 | (R7 + R8)/(R7 − R8) | 0.98 |
| N2 | 1.640 | f4/f2 | 0.34 |
| CT3/CT2 | 1.10 | SD/TD | 0.97 |
| T23/T12 | 1.59 | FOV [deg.] | 78.2 |
| |Sag22|/Sag21 | −0.08 | | |

6th Embodiment

Figure 11:
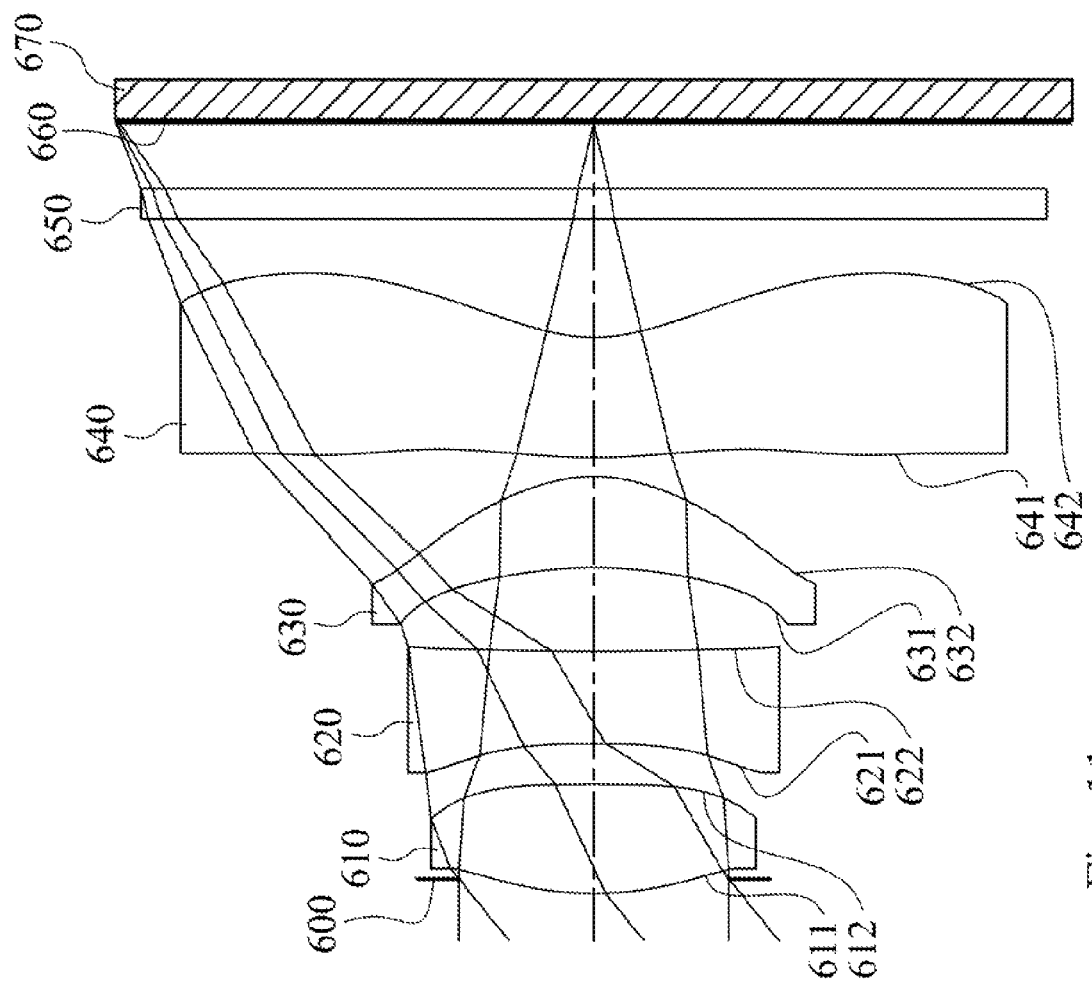
FIG. 11 is a schematic view of an image capturing device according to the 6th embodiment of the present disclosure.
Figure 12:
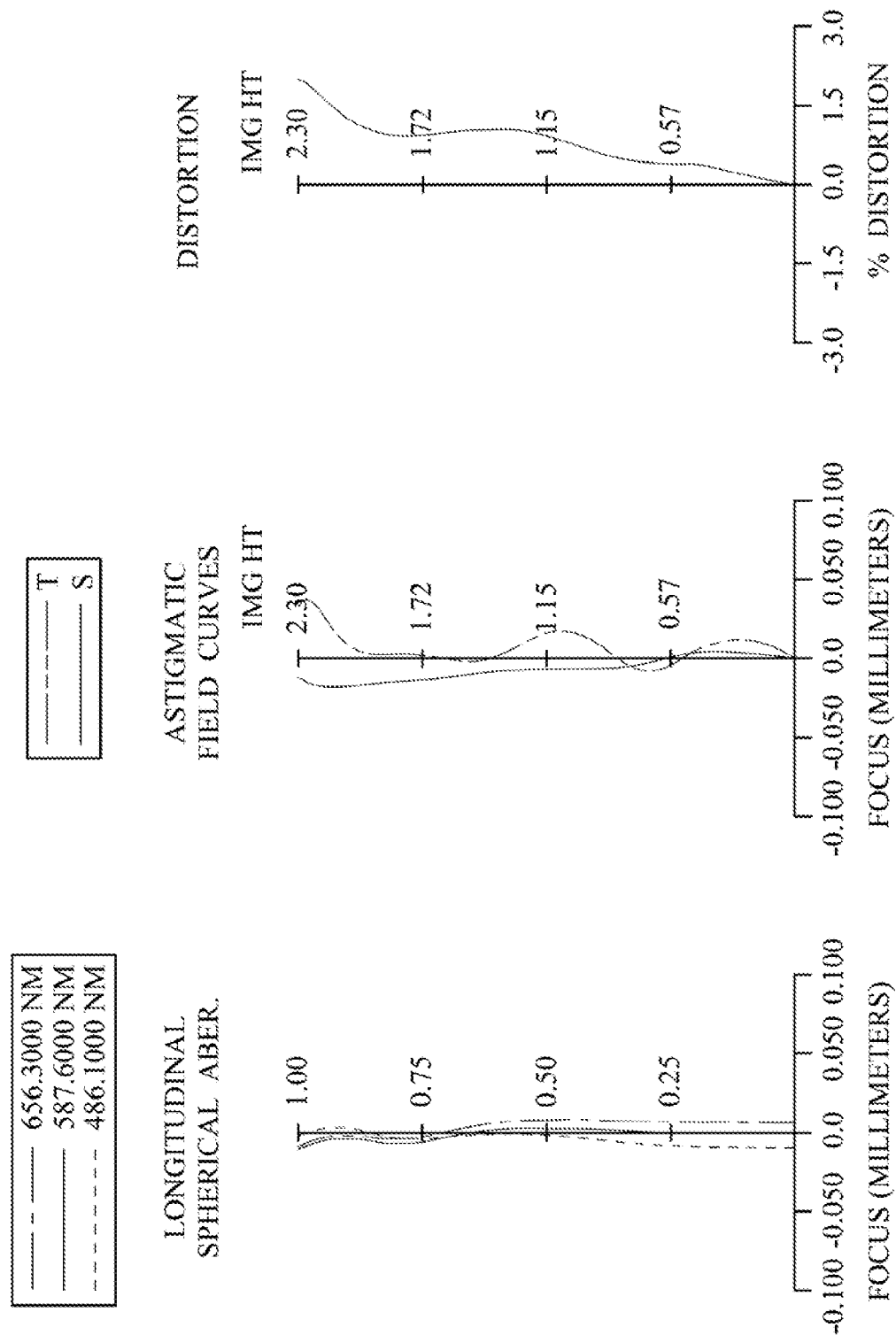
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows, in order from left to right, spherical aberration curves, astigmatic field curves and a distortion curve of the image capturing device according to the 6th embodiment.

In FIG. 11, the image capturing device includes the image lens assembly (not otherwise herein labeled) of the present disclosure and an image sensor 670. The image lens assembly includes, in order from an object side to an image side, an aperture stop 600, a first lens element 610, a second lens element 620, a third lens element 630, a fourth lens element 640, an IR-cut filter 650 and an image plane 660, wherein the image lens assembly has a total of four lens elements (610-640) with refractive power, and any two lens elements of the image lens assembly adjacent to each other have a space between the two lens elements.

The first lens element 610 with positive refractive power has an object-side surface 611 being convex in a paraxial region thereof and an image-side surface 612 being convex in a paraxial region thereof, which are both aspheric, and the first lens element 610 is made of plastic material.

The second lens element 620 with negative refractive power has an object-side surface 621 being concave in a paraxial region thereof and an image-side surface 622 being concave in a paraxial region thereof, which are both aspheric, and the second lens element 620 is made of plastic material.

The third lens element 630 with positive refractive power has an object-side surface 631 being concave in a paraxial region thereof and an image-side surface 632 being convex in a paraxial region thereof, which are both aspheric, and the third lens element 630 is made of plastic material.

The fourth lens element 640 with negative refractive power has an object-side surface 641 being convex in a paraxial region thereof and an image-side surface 642 being concave in a paraxial region thereof, which are both aspheric, and the fourth lens element 640 is made of plastic material. Furthermore, the image-side surface 642 of the fourth lens element 640 has at least one inflection point.

The IR-cut filter 650 is made of glass and located between the fourth lens element 640 and the image plane 660, and will not affect the focal length of the image lens assembly. The image sensor 670 is disposed on the image plane 660 of the image lens assembly.

The detailed optical data of the 6th embodiment are shown in Table 11 and the aspheric surface data are shown in Table 12 below.

TABLE 11

Embodiment 6
f = 2.79 Fno = 2.15, HFOV = 38.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.071 | | | | |
| 2 | Lens 1 | 1.582 | ASP | 0.524 | Plastic | 1.544 | 55.9 | 2.58 |
| 3 | | −10.621 | ASP | 0.195 | | | | |
| 4 | Lens 2 | −4.244 | ASP | 0.444 | Plastic | 1.650 | 21.4 | −5.10 |
| 5 | | 15.688 | ASP | 0.406 | | | | |
| 6 | Lens 3 | −1.921 | ASP | 0.438 | Plastic | 1.530 | 55.8 | 2.03 |
| 7 | | −0.744 | ASP | 0.092 | | | | |
| 8 | Lens 4 | 3.253 | ASP | 0.578 | Plastic | 1.530 | 55.8 | −2.15 |
| 9 | | 0.791 | ASP | 0.570 | | | | |
| 10 | IR-cut filter | Plano | | 0.145 | Glass | 1.517 | 64.2 | — |
| 11 | | Plano | | 0.325 | | | | |
| 12 | Image | Plano | | — | | | | |

Note:
Reference wavelength is 587.6 nm (d-line).

TABLE 12

Aspheric Coefficients

| Surface # | 2 | 3 | 4 | 5 |
|---|---|---|---|---|
| k = | −1.1068E+00 | 6.6675E+01 | −2.5342E+01 | 5.2005E+01 |
| A4 = | −5.9773E−03 | −1.9493E−01 | −2.5180E−01 | 1.6720E−02 |
| A6 = | −2.0162E−01 | −3.5424E−01 | −2.4063E−01 | −1.6551E−01 |
| A8 = | 4.3038E−01 | 3.8397E−01 | 2.8273E−01 | 1.7373E−01 |
| A10 = | −1.0801E+00 | −3.9584E−01 | 7.2360E−01 | 4.8763E−02 |
| A12 = | | | −4.9037E−01 | −6.2781E−02 |

| Surface # | 6 | 7 | 8 | 9 |
|---|---|---|---|---|
| k = | 3.0778E+00 | −2.6100E+00 | 7.3103E−01 | −5.1031E+00 |
| A4 = | 3.0794E−01 | 8.7243E−02 | −1.5146E−01 | −1.0273E−01 |
| A6 = | −5.5800E−01 | −8.8158E−01 | −9.2145E−02 | 3.6174E−02 |
| A8 = | 1.3645E+00 | 2.9389E+00 | 2.0607E−01 | −5.4562E−03 |
| A10 = | −3.4527E+00 | −5.8346E+00 | −1.3171E−01 | −2.2860E−03 |
| A12 = | 5.3436E+00 | 6.4188E+00 | 4.2545E−02 | 1.2863E−03 |
| A14 = | −4.1500E+00 | −3.5192E+00 | −7.1295E−03 | −2.2281E−04 |
| A16 = | 1.3233E+00 | 7.5692E−01 | 4.9050E−04 | 1.2049E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.79 | (R1 + R2)/(R1 − R2) | −0.74 |
| Fno | 2.15 | (R3 + R4)/(R3 − R4) | −0.57 |
| HFOV [deg.] | 38.9 | (R7 + R8)/(R7 − R8) | 1.64 |
| N2 | 1.650 | f4/f2 | 0.42 |
| CT3/CT2 | 0.99 | SD/TD | 0.97 |
| T23/T12 | 2.08 | FOV [deg.] | 77.8 |
| |Sag22|/Sag21 | −0.16 | | |

7th Embodiment

Figure 13:
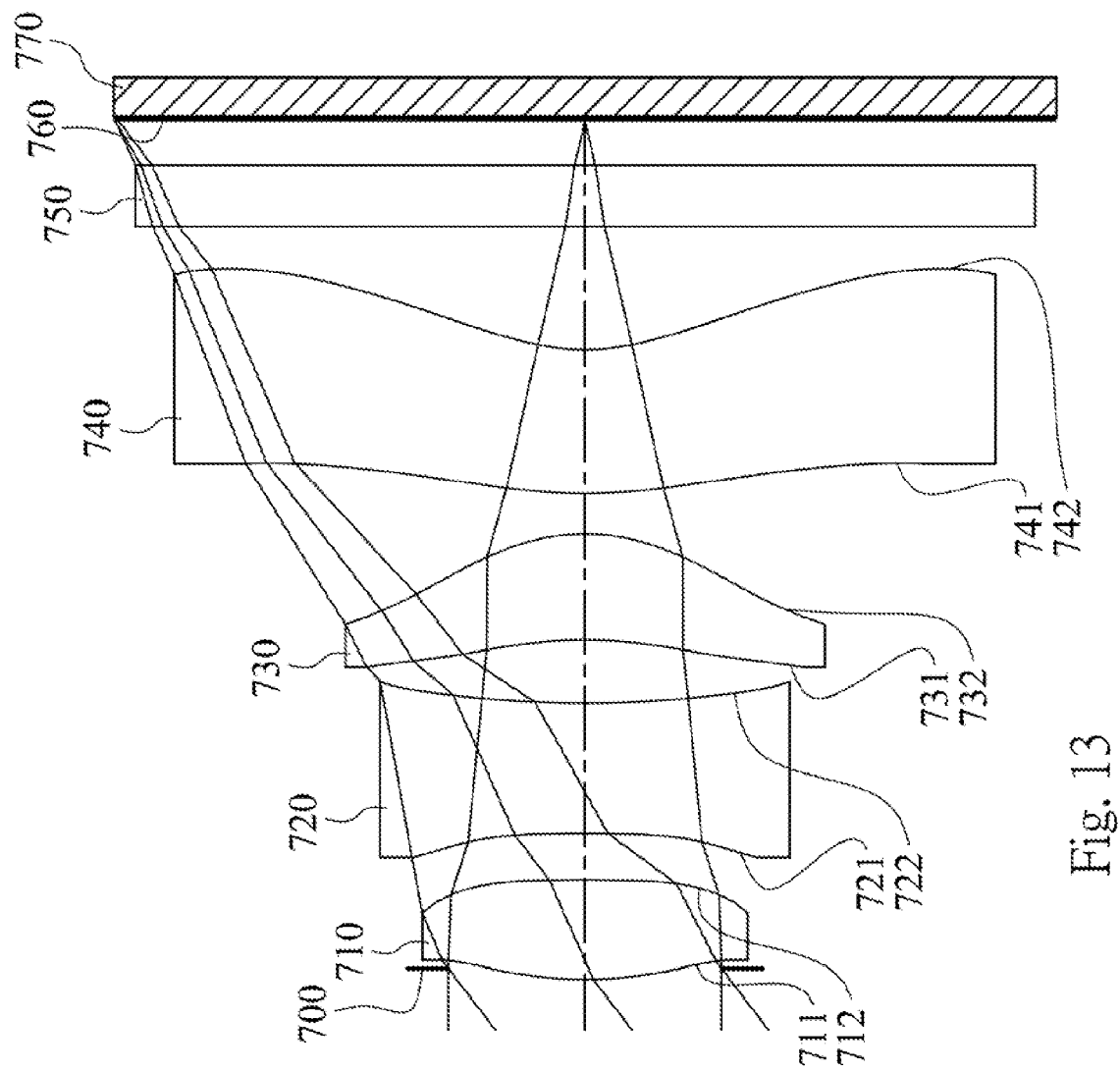
FIG. 13 is a schematic view of an image capturing device according to the 7th embodiment of the present disclosure.
Figure 14:
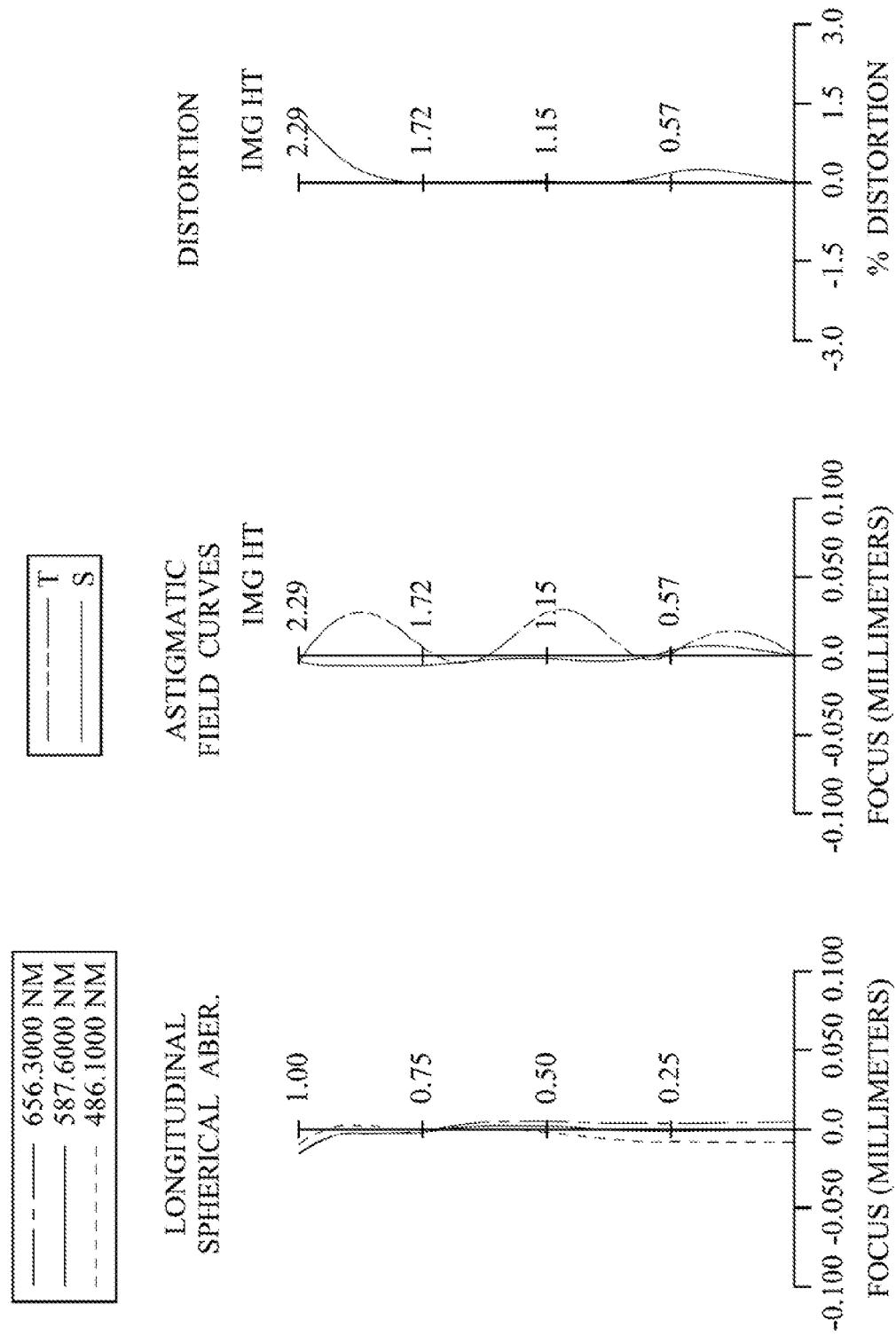
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows, in order from left to right, spherical aberration curves, astigmatic field curves and a distortion curve of the image capturing device according to the 7th embodiment.

In FIG. 13, the image capturing device includes the image lens assembly (not otherwise herein labeled) of the present disclosure and an image sensor 770. The image lens assembly includes, in order from an object side to an image side, an aperture stop 700, a first lens element 710, a second lens element 720, a third lens element 730, a fourth lens element 740, an IR-cut filter 750 and an image plane 760, wherein the image lens assembly has a total of four lens elements (710-740) with refractive power, and any two lens elements of the image lens assembly adjacent to each other have a space between the two lens elements.

The first lens element 710 with positive refractive power has an object-side surface 711 being convex in a paraxial region thereof and an image-side surface 712 being convex in a paraxial region thereof, which are both aspheric, and the first lens element 710 is made of plastic material.

The second lens element 720 with negative refractive power has an object-side surface 721 being concave in a paraxial region thereof and an image-side surface 722 being concave in a paraxial region thereof, which are both aspheric, and the second lens element 720 is made of plastic material.

The third lens element 730 with positive refractive power has an object-side surface 731 being concave in a paraxial region thereof and an image-side surface 732 being convex in a paraxial region thereof, which are both aspheric, and the third lens element 730 is made of plastic material.

The fourth lens element 740 with negative refractive power has an object-side surface 741 being convex in a paraxial region thereof and an image-side surface 742 being concave in a paraxial region thereof, which are both aspheric, and the fourth lens element 740 is made of plastic material. Furthermore, the image-side surface 742 of the fourth lens element 740 has at least one inflection point.

The IR-cut filter 750 is made of glass and located between the fourth lens element 740 and the image plane 760, and will not affect the focal length of the image lens assembly. The image sensor 770 is disposed on the image plane 760 of the image lens assembly.

The detailed optical data of the 7th embodiment are shown in Table 13 and the aspheric surface data are shown in Table 14 below.

TABLE 13

Embodiment 7
f = 2.95 Fno = 2.22, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.052 | | | | |
| 2 | Lens 1 | 1.910 | ASP | 0.487 | Plastic | 1.544 | 55.9 | 2.96 |
| 3 | | −9.316 | ASP | 0.226 | | | | |
| 4 | Lens 2 | −8.657 | ASP | 0.635 | Plastic | 1.634 | 23.8 | −5.23 |
| 5 | | 5.521 | ASP | 0.306 | | | | |
| 6 | Lens 3 | −2.008 | ASP | 0.520 | Plastic | 1.544 | 55.9 | 2.78 |
| 7 | | −0.941 | ASP | 0.194 | | | | |
| 8 | Lens 4 | 2.377 | ASP | 0.704 | Plastic | 1.634 | 23.8 | −3.60 |
| 9 | | 1.030 | ASP | 0.600 | | | | |
| 10 | IR-cut filter | Plano | | 0.300 | Glass | 1.517 | 64.2 | — |
| 11 | | Plano | | 0.228 | | | | |
| 12 | Image | Plano | | — | | | | |

Note:
Reference wavelength is 587.6 nm (d-line).

TABLE 14

Aspheric Coefficients

| Surface # | 2 | 3 | 4 | 5 |
|---|---|---|---|---|
| k = | −1.7816E+00 | 8.3927E+01 | 6.1482E+01 | 2.6812E+01 |
| A4 = | −1.7808E−02 | −1.8499E−01 | −18800E−01 | 7.6284E−03 |
| A6 = | −1.9911E−01 | −2.2642E−01 | −1.5165E−01 | −9.9135E−02 |
| A8 = | 3.1515E−01 | 2.4404E−01 | 1.6573E−01 | 6.3757E−02 |
| A10 = | −7.6165E−01 | −2.9978E−01 | 3.3407E−01 | 1.3894E−02 |
| A12 = | | | −1.6445E−01 | −1.9926E−02 |

| Surface # | 6 | 7 | 8 | 9 |
|---|---|---|---|---|
| k = | 1.7848E+00 | −2.6743E+00 | −3.4591E+00 | −5.1031E+00 |
| A4 = | 2.8664E−01 | −5.6972E−02 | −1.6186E−01 | −6.2647E−02 |
| A6 = | −6.4780E−01 | −3.3515E−01 | 1.6686E−01 | 3.1630E−02 |
| A8 = | 2.6599E+00 | 1.6978E+00 | −1.3776E−01 | −1.3843E−02 |
| A10 = | −5.9060E+00 | −3.1013E+00 | 7.5314E−02 | 3.8294E−03 |
| A12 = | 7.1769E+00 | 3.0309E+00 | −2.4663E−02 | −6.0069E−04 |
| A14 = | −4.5267E+00 | −1.5329E+00 | 4.3848E−03 | 4.5199E−05 |
| A16 = | 1.1567E+00 | 3.1081E−01 | −3.3031E−04 | −1.2864E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.95 | (R1 + R2)/(R1 − R2) | −0.66 |
| Fno | 2.22 | (R3 + R4)/(R3 − R4) | 0.22 |
| HFOV [deg.] | 37.5 | (R7 + R8)/(R7 − R8) | 2.53 |
| N2 | 1.634 | f4/f2 | 0.69 |
| CT3/CT2 | 0.82 | SD/TD | 0.98 |
| T23/T12 | 1.35 | FOV [deg.] | 75.0 |
| |Sag22|/Sag21 | −0.89 | | |

8th Embodiment

Figure 15:
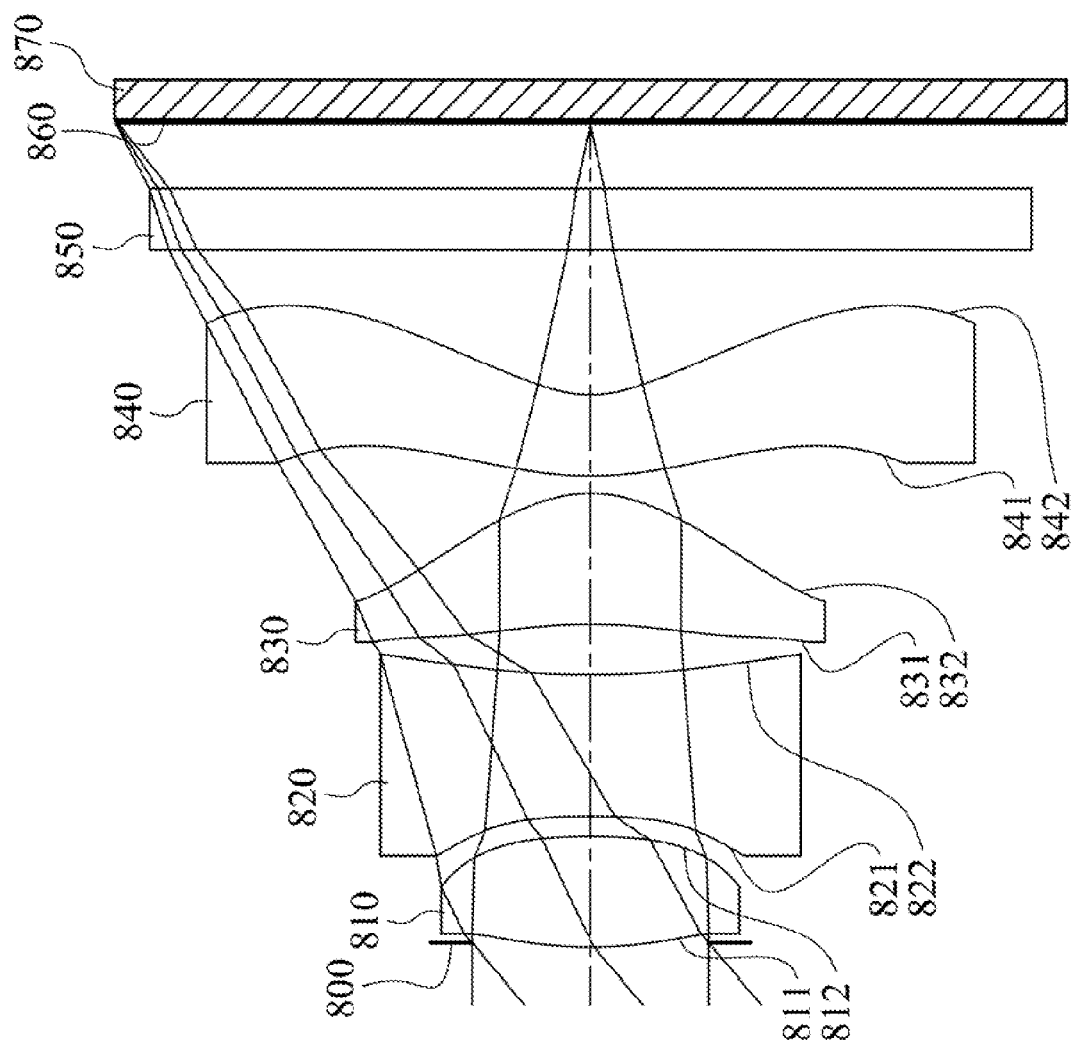
FIG. 15 is a schematic view of an image capturing device according to the 8th embodiment of the present disclosure.
Figure 16:
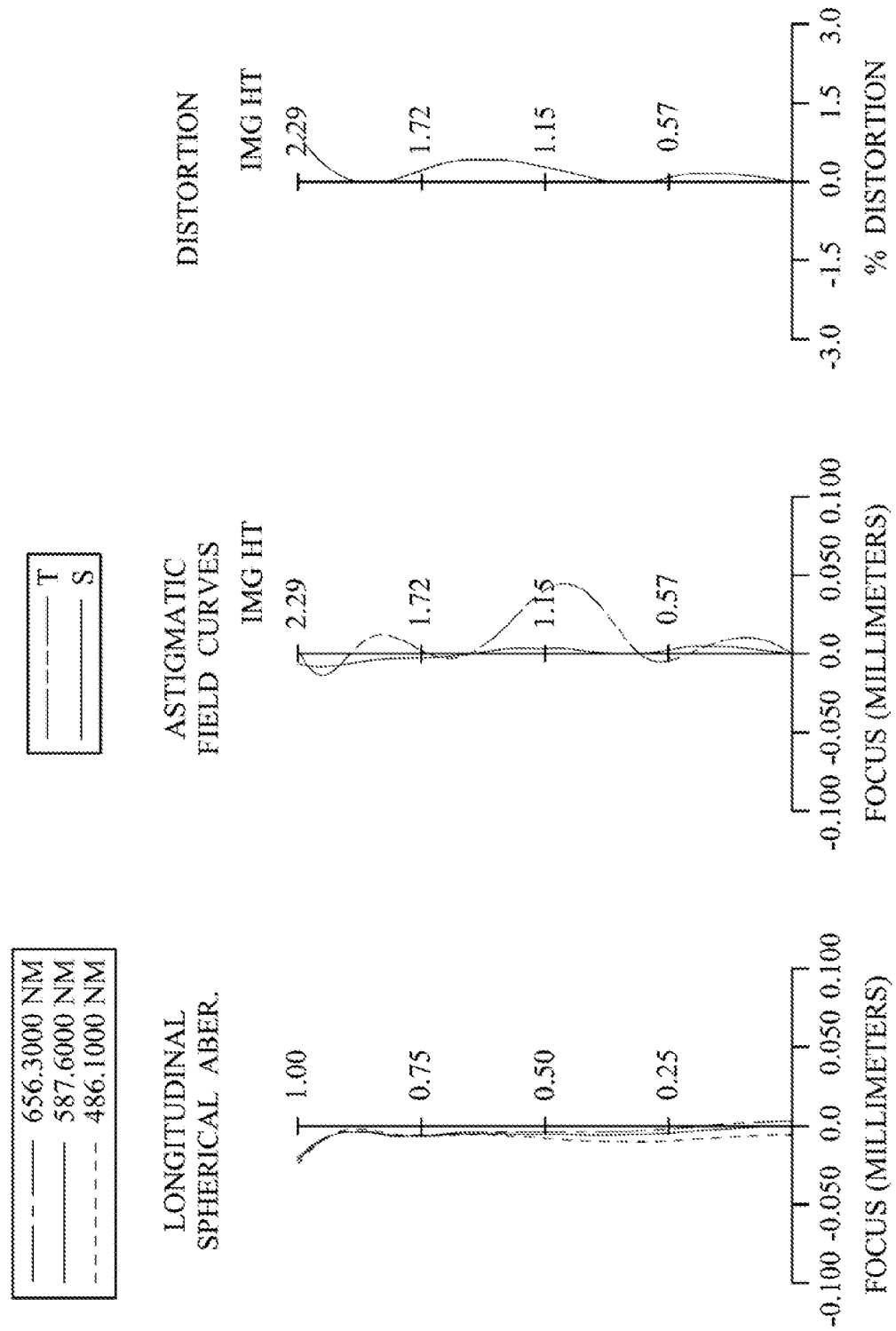
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows, in order from left to right, spherical aberration curves, astigmatic field curves and a distortion curve of the image capturing device according to the 8th embodiment.

In FIG. 15, the image capturing device includes the image lens assembly (not otherwise herein labeled) of the present disclosure and an image sensor 870. The image lens assembly includes, in order from an object side to an image side, an aperture stop 800, a first lens element 810, a second lens element 820, a third lens element 830, a fourth lens element 840, an IR-cut filter 850 and an image plane 860, wherein the image lens assembly has a total of four lens elements (810-840) with refractive power, and any two lens elements of the image lens assembly adjacent to each other have a space between the two lens elements.

The first lens element 810 with positive refractive power has an object-side surface 811 being convex in a paraxial region thereof and an image-side surface 812 being convex in a paraxial region thereof, which are both aspheric, and the first lens element 810 is made of plastic material.

The second lens element 820 with negative refractive power has an object-side surface 821 being concave in a paraxial region thereof and an image-side surface 822 being concave in a paraxial region thereof, which are both aspheric, and the second lens element 820 is made of plastic material.

The third lens element 830 with positive refractive power has an object-side surface 831 being concave in a paraxial region thereof and an image-side surface 832 being convex in a paraxial region thereof, which are both aspheric, and the third lens element 830 is made of plastic material.

The fourth lens element 840 with negative refractive power has an object-side surface 841 being convex in a paraxial region thereof and an image-side surface 842 being concave in a paraxial region thereof, which are both aspheric, and the fourth lens element 840 is made of plastic material. Furthermore, the image-side surface 842 of the fourth lens element 840 has at least one inflection point.

The IR-cut filter 850 is made of glass and located between the fourth lens element 840 and the image plane 860, and will not affect the focal length of the image lens assembly. The image sensor 870 is disposed on the image plane 860 of the image lens assembly.

The detailed optical data of the 8th embodiment are shown in Table 15 and the aspheric surface data are shown in Table 16 below.

TABLE 15

Embodiment 8
f = 2.69 Fno = 2.35, HFOV = 40.3 deg,

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.020 | | | | |
| 2 | Lens 1 | 2.048 | ASP | 0.537 | Plastic | 1.514 | 56.8 | 2.46 |
| 3 | | −2.997 | ASP | 0.098 | | | | |
| 4 | Lens 2 | −3.553 | ASP | 0.685 | Plastic | 1.583 | 30.2 | −3.29 |
| 5 | | 4.483 | ASP | 0.241 | | | | |
| 6 | Lens 3 | −2.332 | ASP | 0.634 | Plastic | 1.544 | 55.9 | 1.40 |
| 7 | | −0.630 | ASP | 0.088 | | | | |
| 8 | Lens 4 | 1.742 | ASP | 0.389 | Plastic | 1.583 | 30.2 | −1.65 |
| 9 | | 0.569 | ASP | 0.700 | | | | |
| 10 | IR-cut filter | Plano | | 0.300 | 0.300 | 1.517 | 64.2 | — |
| 11 | | Plano | | 0.325 | 0.325 | | | |
| 12 | Image | Plano | | — | | | | |

Note:
Reference wavelength is 587.6 nm (d-line).

TABLE 16

Aspheric Coefficients

| Surface # | 2 | 3 | 4 | 5 |
|---|---|---|---|---|
| k = | −1.7562E+00 | 1.3992E+01 | 1.8338E+01 | 1.5225E+01 |
| A4 = | −2.0022E−02 | −3.8241E−01 | −4.3161E−01 | 4.9341E−03 |
| A6 = | −3.9961E−01 | −1.7191E−01 | −8.0464E−02 | −9.4581E−02 |
| A8 = | 1.0936E+00 | 4.1188E−01 | 3.1119E−01 | 4.5174E−02 |
| A10 = | −3.1480E+00 | −4.6692E−01 | 5.3959E−01 | 1.4459E−02 |
| A12 = | −2.5183E−08 | 1.1366E−08 | 3.5905E−01 | −3.4273E−02 |
| A14 = | −5.4160E−09 | 1.4619E−09 | −3.7201E−09 | −1.3906E−02 |
| A16 = | −9.7886E−10 | 1.4826E−10 | −7.8273E−10 | 1.6579E−02 |

| Surface # | 6 | 7 | 8 | 9 |
|---|---|---|---|---|
| k = | 2.0735E+00 | −3.2732E+00 | −3.4118E+00 | −4.2853E+00 |
| A4 = | 3.1835E−01 | −1.1911E−01 | 1.7948E−01 | −8.5497E−02 |
| A6 = | −6.6040E−01 | −3.0532E−01 | 1.4259E−01 | 5.3442E−02 |
| A8 = | 2.6253E+00 | 1.7067E+00 | −8.0698E−02 | −3.4882E−02 |
| A14 = | −5.9182E+00 | −3.1082E+00 | −1.1842E−03 | 1.3170E−02 |
| A12 = | 7.1821E+00 | 3.0175E+00 | 2.2629E−02 | −2.7822E−03 |
| A14 = | −4.5195E+00 | −1.5399E+00 | −9.2346E−03 | 3.0882E−04 |
| A16 = | 1.1528E+00 | 3.2398E−01 | 1.1629E−03 | −1.4841E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

8th Embodiment

| f [mm] | 2.69 | (R1 + R2)/(R1 − R2) | −0.19 |
|---|---|---|---|
| Fno | 2.35 | (R3 + R4)/(R3 − R4) | −0.12 |
| HFOV [deg.] | 40.3 | (R7 + R8)/(R7 − R8) | 1.97 |
| N2 | 1.583 | f4/f2 | 0.50 |
| CT3/CT2 | 0.93 | SD/TD | 0.99 |
| T23/T12 | 2.46 | FOV [deg.] | 80.6 |
| |Sag22|/Sag21 | −0.50 | | |

9th Embodiment

Figure 17:
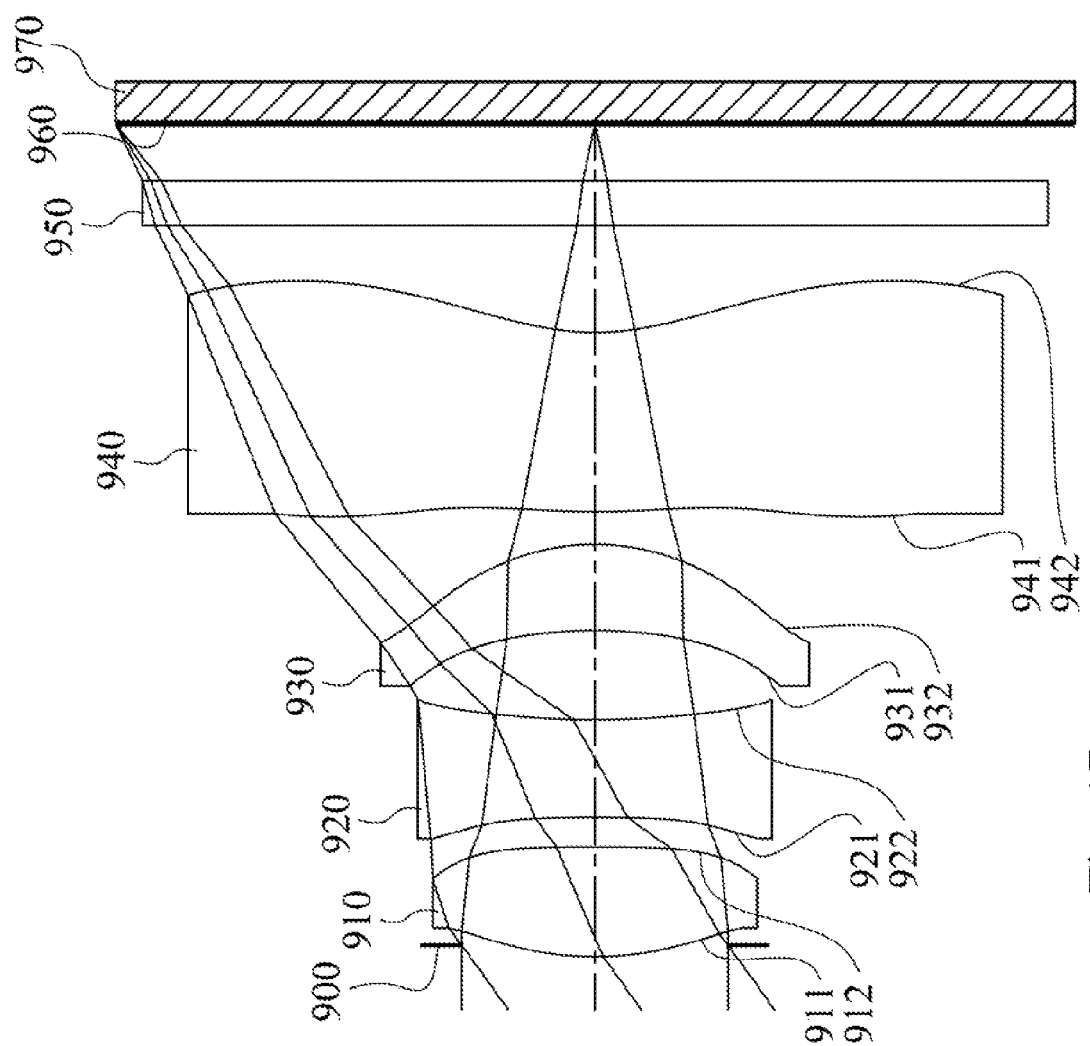
FIG. 17 is a schematic view of an image capturing device according to the 9th embodiment of the present disclosure.
Figure 18:
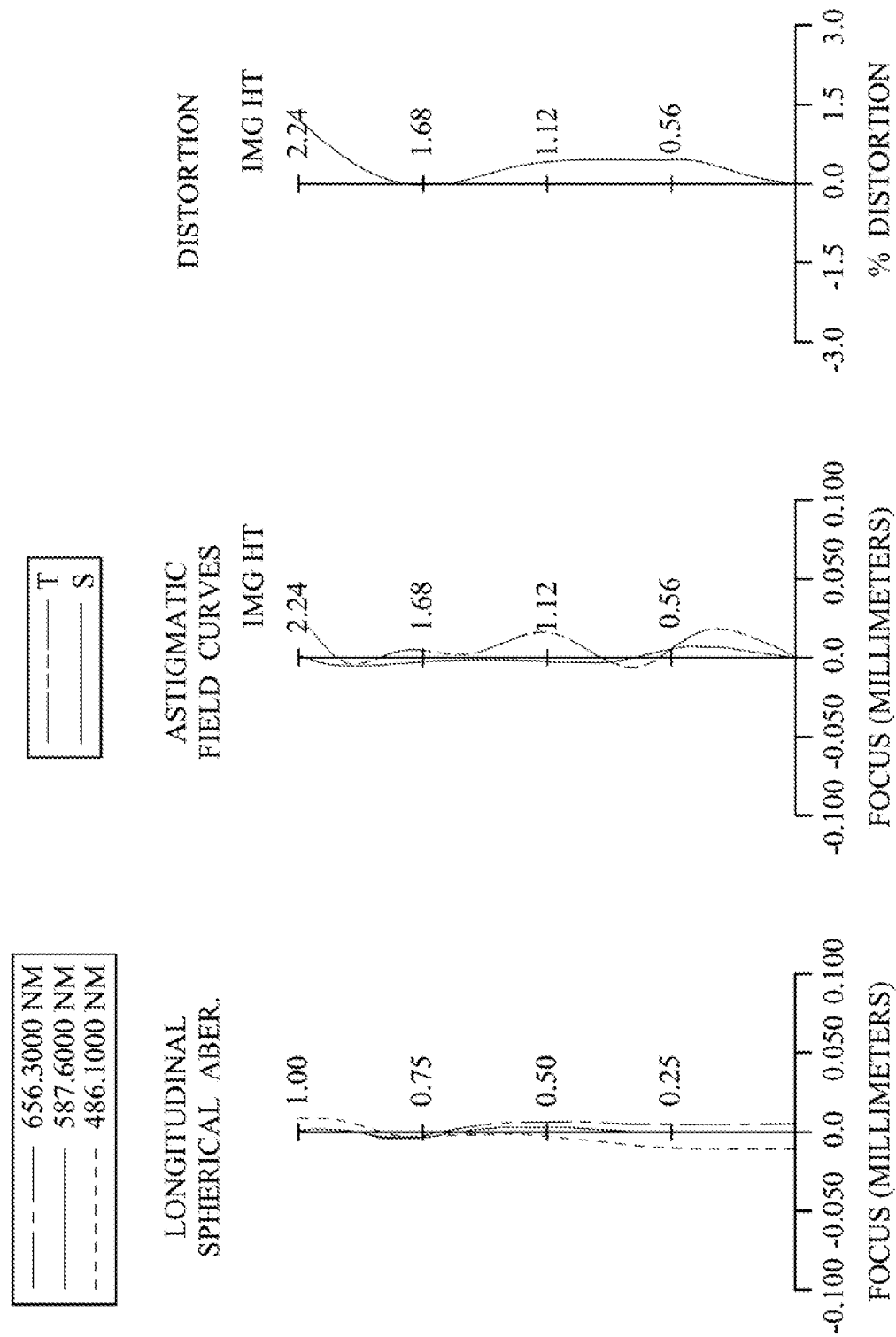
FIG. 18 shows spherical aberration curves, astigmatic field curves and a distortion curve of the image capturing device according to the 9th embodiment.

FIG. 17 is a schematic view of an image capturing device according to the 9th embodiment of the present disclosure. FIG. 18 shows, in order from left to right, spherical aberration curves, astigmatic field curves and a distortion curve of the image capturing device according to the 9th embodiment.

In FIG. 17, the image capturing device includes the image lens assembly (not otherwise herein labeled) of the present disclosure and an image sensor 970. The image lens assembly includes, in order from an object side to an image side, an aperture stop 900, a first lens element 910, a second lens element 920, a third lens element 930, a fourth lens element 940, an IR-cut filter 950 and an image plane 960, wherein the image lens assembly has a total of four lens elements (910-940) with refractive power, and any two lens elements of the image lens assembly adjacent to each other have a space between the two lens elements.

The first lens element 910 with positive refractive power has an object-side surface 911 being convex in a paraxial region thereof and an image-side surface 912 being convex in a paraxial region thereof, which are both aspheric, and the first lens element 910 is made of plastic material.

The second lens element 920 with negative refractive power has an object-side surface 921 being concave in a paraxial region thereof and an image-side surface 922 being concave in a paraxial region thereof, which are both aspheric, and the second lens element 920 is made of plastic material.

The third lens element 930 with positive refractive power has an object-side surface 931 being concave in a paraxial region thereof and an image-side surface 932 being convex in a paraxial region thereof, which are both aspheric, and the third lens element 930 is made of plastic material.

The fourth lens element 940 with negative refractive power has an object-side surface 941 being convex in a paraxial region thereof and an image-side surface 942 being concave in a paraxial region thereof, which are both aspheric, and the fourth lens element 940 is made of plastic material. Furthermore, the image-side surface 942 of the fourth lens element 940 has at least one inflection point.

The IR-cut filter 950 is made of glass and located between the fourth lens element 940 and the image plane 960, and will not affect the focal length of the image lens assembly. The image sensor 970 is disposed on the image plane 960 of the image lens assembly.

The detailed optical data of the 9th embodiment are shown in Table 17 and the aspheric surface data are shown in Table 18 below.

TABLE 17

Embodiment 9
f = 3.05 Fno = 2.45, HFOV = 36.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.053 | | | | |
| 2 | Lens 1 | 1.473 | ASP | 0.517 | Plastic | 1.544 | 55.9 | 2.50 |
| 3 | | −15.646 | ASP | 0.138 | | | | |
| 4 | Lens 2 | −10.184 | ASP | 0.458 | Plastic | 1.640 | 23.3 | −4.55 |
| 5 | | 4.145 | ASP | 0.416 | | | | |
| 6 | Lens 3 | −2.005 | ASP | 0.405 | Plastic | 1.544 | 55.9 | 3.63 |
| 7 | | −1.066 | ASP | 0.150 | | | | |
| 8 | Lens 4 | 3.415 | ASP | 0.843 | Plastic | 1.544 | 55.9 | −3.80 |
| 9 | | 1.176 | ASP | 0.500 | | | | |
| 10 | IR-cut filter | Plano | | 0.210 | Glass | 1.517 | 64.2 | — |
| 11 | | Plano | | 0.268 | | | | |
| 12 | Image | Plano | | — | | | | |

Note:
Reference wavelength is 587.6 nm (d-line).

TABLE 18

Aspheric Coefficients

| Surface # | 2 | 3 | 4 | 5 |
|---|---|---|---|---|
| k = | −1.1225E+00 | 5.9415E+01 | −6.2178E+01 | 2.0185E+01 |
| A4 = | 2.2559E−02 | −2.2289E−01 | −2.5243E−01 | −3.2354E−02 |
| A6 = | −2.3220E−01 | −3.7845E−01 | −2.2048E−01 | −1.5662E−01 |
| A8 = | 5.7406E−01 | 3.7551E−01 | 1.0120E−01 | 2.2673E−01 |
| A10 = | −1.3503E+00 | −4.0971E−01 | 9.2619E−01 | −8.0095E−02 |
| A12 = | −4.9411E−09 | 3.5368E−09 | −4.1240E−01 | 2.7882E−02 |
| A14 = | −1.2327E−09 | 3.0035E−09 | −5.2130E−09 | 6.7478E−10 |
| A16 = | −3.1837E−10 | 1.1009E−09 | −1.8442E−09 | 2.3323E−10 |

| Surface # | 6 | 7 | 8 | 9 |
|---|---|---|---|---|
| k = | 2.8263E+00 | −2.1956E+00 | −8.4485E−01 | −4.8977E+00 |
| A4 = | 1.8866E−01 | −7.9915E−02 | 3.3072E−01 | −1.3661E−01 |
| A6 = | −5.6432E−01 | −6.7623E−01 | 1.8003E−01 | 8.3396E−02 |
| A8 = | 6.5217E−02 | 2.6850E+00 | 5.2602E−02 | −4.1155E−02 |
| A10 = | 1.6026E+00 | −6.0858E+00 | −9.6086E−02 | 1.3970E−02 |
| A12 = | −3.3283E+00 | 7.5562E+00 | 4.2207E−02 | −2.8462E−03 |
| A14 = | 3.3856E+00 | −4.4300E+00 | −8.2273E−03 | 3.0044E−04 |
| A16 = | −1.4397E+00 | 9.5440E−01 | 6.0909E−04 | −1.2161E−05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 3.05 | (R1 + R2)/(R1 − R2) | −0.83 |
| Fno | 2.45 | (R3 + R4)/(R3 − R4) | 0.42 |
| HFOV [deg.] | 36.0 | (R7 + R8)/(R7 − R8) | 2.05 |
| N2 | 1.640 | f4/f2 | 0.84 |
| CT3/CT2 | 0.88 | SD/TD | 0.98 |
| T23/T12 | 3.01 | FOV [deg.] | 72.0 |
| |Sag22|/Sag21 | −0.95 | | |

10th Embodiment

Figure 20:
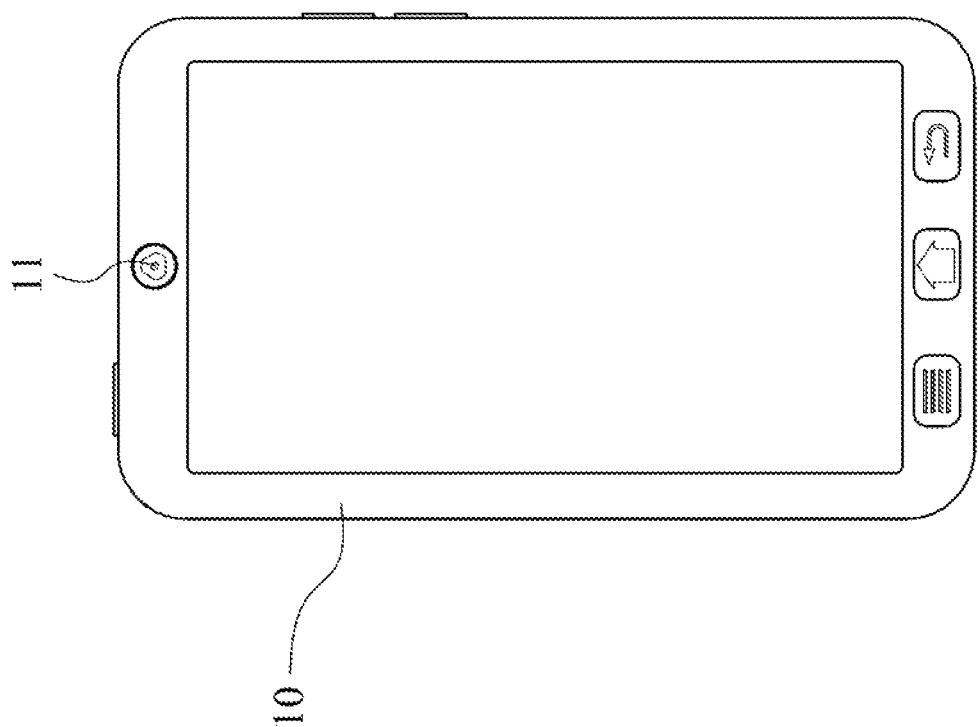
FIG. 20 shows a smart phone with an image capturing device of the present disclosure installed therein.

FIG. 20 is a schematic view of a mobile terminal 10 according to the 10th embodiment of the present disclosure. The mobile terminal 10 of the 10th embodiment is a smart phone, wherein the mobile terminal 10 includes an image capturing device 11. The image capturing device 11 includes an image lens assembly (not otherwise herein labeled) according to the present disclosure and an image sensor (not otherwise herein labeled), wherein the image sensor is disposed on an image plane of the image lens assembly.

11th Embodiment

Figure 21:
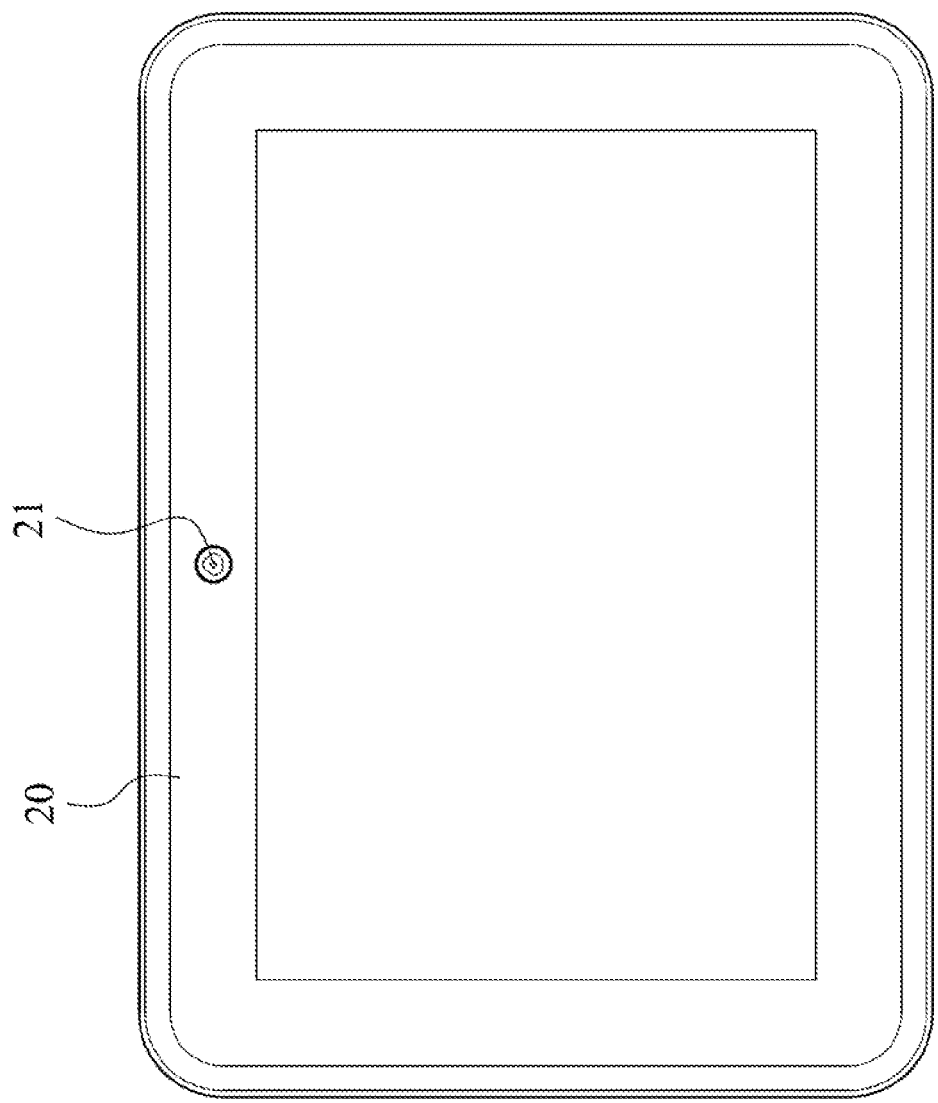
FIG. 21 shows a tablet personal computer with an image capturing device of the present disclosure installed therein.

FIG. 21 is a schematic view of a mobile terminal 20 according to the 11th embodiment of the present disclosure. The mobile terminal 20 of the 11th embodiment is a tablet personal computer, wherein the mobile terminal 20 includes an image capturing device 21. The image capturing device 21 includes an image lens assembly (not otherwise herein labeled) according to the present disclosure and an image sensor (not otherwise herein labeled), wherein the image sensor is disposed on an image plane of the image lens assembly.

12th Embodiment

Figure 22:
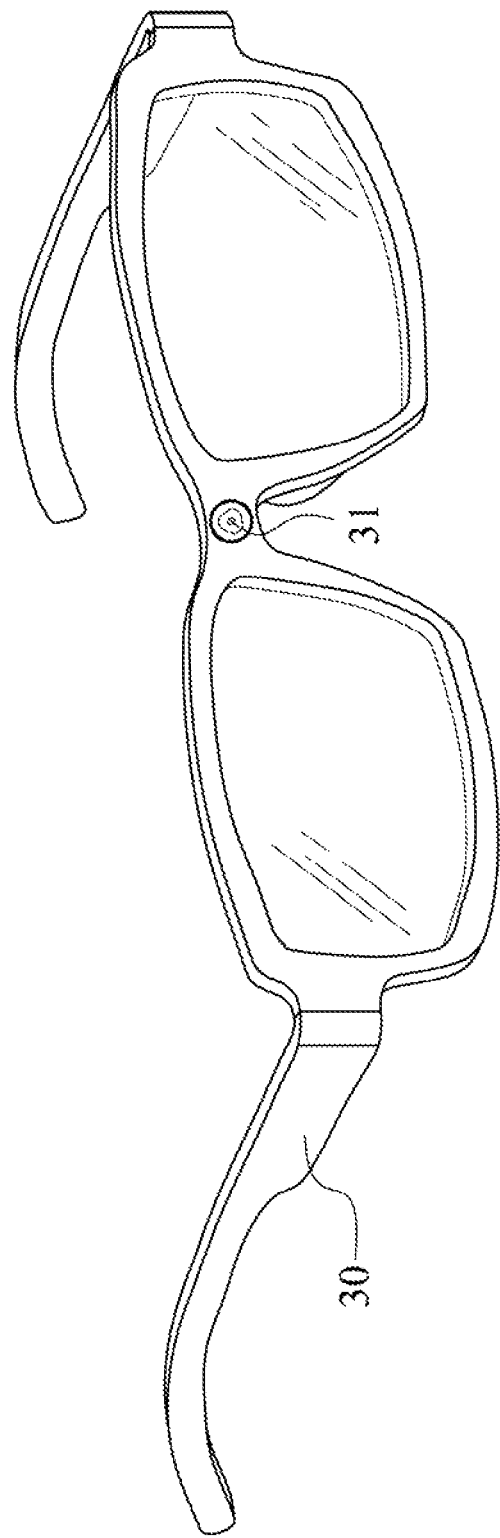
FIG. 22 shows a wearable device with an image capturing device of the present disclosure installed therein.

FIG. 22 is a schematic view of a mobile terminal 30 according to the 12th embodiment of the present disclosure. The mobile terminal 30 of the 12th embodiment is a head-mounted display, wherein the mobile terminal 30 includes an image capturing device 31. The image capturing device 31 includes an image lens assembly (not otherwise herein labeled) according to the present disclosure and an image sensor (not otherwise herein labeled), wherein the image sensor is disposed on an image plane of the image lens assembly.

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image lens assembly comprising, in order from an object side to an image side:
   a first lens element with positive refractive power having an object-side surface being convex in a paraxial region thereof;
   a second lens element with negative refractive power having an object-side surface being concave in a paraxial region thereof and an image-side surface being concave in a paraxial region thereof, wherein at least one of the object-side surface and the image-side surface of the second lens element is aspheric;
   a third lens element with positive refractive power having an object-side surface being concave in a paraxial region thereof and an image-side surface being convex in a paraxial region thereof, wherein at least one of the object-side surface and the image-side surface of the third lens element is aspheric; and
   a fourth lens element with negative refractive power having an object-side surface being convex in a paraxial region thereof and an image-side surface being concave in a paraxial region thereof, wherein both of the object-side surface and the image-side surface of the fourth lens element are aspheric, and the image-side surface of the fourth lens element has at least one inflection point;
   wherein the image lens assembly has a total of four lens elements with refractive power, any two lens elements of the image lens assembly adjacent to each other have a space between the two lens elements, a central thickness of the second lens element is CT2, a central thickness of the third lens element is CT3, a curvature radius of the object-side surface of the second lens element is R3, a curvature radius of the image-side surface of the second lens element is R4, a focal length of the second lens element is f2, a focal length of the fourth lens element is f4, and the following conditions are satisfied:

$0.65 < CT3/CT2 < 1.05$;

$-0.85 < (R3+R4)/(R3-R4) < 0.90$; and $50 < f4/f2 < 0.90$.

2. The image lens assembly of claim 1, wherein the second lens element, the third lens element and the fourth lens element are all made of plastic material, and both of the object-side surface and the image-side surface of the second lens element, the third lens element and the fourth lens element are all aspheric.

3. The image lens assembly of claim 2, further comprising:
   a stop disposed between an imaged object and the first lens element, wherein an axial distance between the stop and the image-side surface of the fourth lens element is SD, an axial distance between the object-side surface of the first lens element and the image-side surface of the fourth lens element is TD, and the following condition is satisfied:

$0.85 < SD/TD < 1.15$.

4. The image lens assembly of claim 3, wherein an axial distance between the first lens element and the second lens element is T12, an axial distance between the second lens element and the third lens element is T23, and the following condition is satisfied:

$1.0 < T23/T12 < 5.0$.

5. The image lens assembly of claim 3, wherein a maximal field of view of the image lens assembly is FOV, and the following condition is satisfied:

70 degrees $<$ FOV $<$ 110 degrees.

6. The image lens assembly of claim 1, wherein a curvature radius of the object-side surface of the first lens element is R1, a curvature radius of the image-side surface of the first lens element is R2, and the following condition is satisfied:

$-1.5 < (R1+R2)/(R1-R2) < 0$.

7. The image lens assembly of claim 1, wherein a curvature radius of the object-side surface of the fourth lens element is R7, a curvature radius of the image-side surface of the fourth lens element is R8, and the following condition is satisfied:

$1.0 \leq (R7+R8)/(R7-R8) < 3.0$.

8. The image lens assembly of claim 1, wherein a distance in parallel with an optical axis from an axial vertex on the object-side surface of the second lens element to a maximum effective radius position on the object-side surface of the second lens element is Sag21, a distance in parallel with an optical axis from an axial vertex on the image-side surface of the second lens element to a maximum effective radius position on the image-side surface of the second lens element is Sag22, and the following condition is satisfied:

$-1.0 < |Sag22|/Sag21 < 0$.

9. The image lens assembly of claim 1, wherein the focal length of the second lens element is f2, the focal length of the fourth lens element is f4, and the following condition is satisfied:

$0.20 < f4/f2 < 0.75$.

10. The image lens assembly of claim 1, wherein the curvature radius of the object-side surface of the second lens element is R3, the curvature radius of the image-side surface of the second lens element is R4, and the following condition is satisfied:

$-0.60 < (R3+R4)/(R3-R4) < 0.45$.

11. The image lens assembly of claim 1, wherein a refractive index of the second lens element is N2, and the following condition is satisfied:

$1.58 < N2 < 1.65$.

12. An image capturing device, comprising:
    the image lens assembly of claim 1; and
    an image sensor, wherein the image sensor is connected to the image lens assembly.

13. A mobile terminal, comprising:
    the image capturing device of claim 12.

14. An image lens assembly comprising, in order from an object side to an image side:
    a first lens element with positive refractive power having an object-side surface being convex in a paraxial region thereof;
    a second lens element with negative refractive power made of plastic material having an object-side surface being concave in a paraxial region thereof, wherein at least one of the object-side surface and an image-side surface of the second lens element is aspheric;

a third lens element with positive refractive power made of plastic material having an object-side surface being concave in a paraxial region thereof and an image-side surface being convex in a paraxial region thereof, wherein at least one of the object-side surface and the image-side surface of the third lens element is aspheric; and a fourth lens element with negative refractive power made of plastic material having an image-side surface being concave in a paraxial region thereof, wherein both of an object-side surface and the image-side surface of the fourth lens element are aspheric, and the image-side surface of the fourth lens element has at least one inflection point;

wherein the image lens assembly has a total of four lens elements with refractive power, any two lens elements of the image lens assembly adjacent to each other have a space between the two lens elements, the image lens assembly further includes a stop disposed between an imaged object and the first lens element, a central thickness of the second lens element is CT2, a central thickness of the third lens element is CT3, a curvature radius of the object-side surface of the second lens element is R3, a curvature radius of the image-side surface of the second lens element is R4, a focal length of the second lens element is f2, a focal length of the fourth lens element is f4, a curvature radius of the object-side surface of the fourth lens element is R7, a curvature radius of the image-side surface of the fourth lens element is R8, an axial distance between the first lens element and the second lens element is T12, an axial distance between the second lens element and the third lens element T23, and the following conditions are satisfied:

0.65<CT3/CT2<1.05;

−1.50<(R3+R4)/(R3−R4)<0.90;

0<f4/f2<0.90;

1.0 ≤(R7+R8)/(R7-R8)<3.0; and 1.0 <T23/T12 ≤3.16

15. The image lens assembly of claim 14, wherein a distance in parallel with an optical axis from an axial vertex on the object-side surface of the second lens element to a maximum effective radius position on the object-side surface of the second lens element is Sag21, a distance in parallel with an optical axis from an axial vertex on the image-side surface of the second lens element to a maximum effective radius position on the image-side surface of the second lens element is Sag22, and the following condition is satisfied:

−1.0<|Sag22|/Sag21<0.

16. The image lens assembly of claim 14, wherein the focal length of the second lens element is f2, the focal length of the fourth lens element is f4, and the following condition is satisfied:

0.20<f4/f2<0.75.

17. The image lens assembly of claim 14, wherein the curvature radius of the object-side surface of the second lens element is R3, the curvature radius of the image-side surface of the second lens element is R4, and the following condition is satisfied:

−1.10≤(R3+R4)/(R3−R4)<0.90.

18. An image capturing device, comprising:
the image lens assembly of claim 14; and
an image sensor, wherein the image sensor is connected to the image lens assembly.

19. A mobile terminal, comprising:
the image capturing device of claim 18.

20. An image lens assembly comprising, in order from an object side to an image side:

a first lens element with positive refractive power having an object-side surface being convex in a paraxial region thereof;

a second lens element with negative refractive power made of plastic material having an object-side surface being concave in a paraxial region thereof, wherein at least one of the object-side surface and an image-side surface of the second lens element is aspheric;

a third lens element with positive refractive power made of plastic material having an object-side surface being concave in a paraxial region thereof and an image-side surface being convex in a paraxial region thereof, wherein at least one of the object-side surface and the image-side surface of the third lens element is aspheric; and a fourth lens element with negative refractive power made of plastic material having an image-side surface being concave in a paraxial region thereof, wherein both of an object-side surface and the image-sidesurface of the fourth lens element are aspheric, and the image-side surface of the fourth lens element has at least one inflection point;

wherein the image lens assembly has a total of four lens elements with refractive power, any two lens elements of the image lens assembly adjacent to each other have a space between the two lens elements,the image lens assembly further includes a stop disposed between an imaged object and the first lens element, a central thickness of the second lens element is CT2, a central thickness of the third lens element is CT3, a curvature radius of the object-side surface of the second lens element is R3, a curvature radius of the image-side surface of the second lens element is R4, a focal length of the second lens element is f2, a focal length of the fourth lens element is f4, a curvature radius of the object-side urface of the fourth lens element is R7, a curvature radius of the image-side surface of he fourth lens element is R8, an axial distance between the first lens element and the second lens element is T12 an axial distance between the second lens element and the third lens element is T23, and the following conditions are satisfied:

0.50<CT3/CT2<1.12;

−1.50<(R3+R4)/(R3−R4)<0.90;

0<f4/f2<0.90;

0<(R7+R8)/(R7-R8)<3.5; and 1.0<T23/T12≤2.46

21. The image lens assembly of claim 20, wherein a distance in parallel with an optical axis from an axial vertex on the object-side surface of the second lens element to a maximum effective radius position on the object-side surface of the second lens element is Sag21, a distance in parallel with an optical axis from an axial vertex on the image-side surface of the second lens element to a maximum effective radius position on the image-side surface of the second lens element is Sag22, and the following condition is satisfied:

−1.0<|Sag22|/Sag21<0.

22. The image lens assembly of claim 20, wherein the focal length of the second lens element is f2, the focal length of the fourth lens element is f4, and the following condition is satisfied:

$$0.20 < f4/f2 < 0.75.$$

23. The image lens assembly of claim 20, wherein the curvature radius of the object-side surface of the fourth lens element is R7, the curvature radius of the image-side surface of the fourth lens element is R8, and the following condition is satisfied:

$$1.0 \leq (R7+R8)/(R7-R8) < 3.0.$$

24. The image lens assembly of claim 20, wherein the central thickness of the second lens element is CT2, the central thickness of the third lens element is CT3, and the following condition is satisfied:

$$0.65 < CT3/CT2 < 1.05.$$

25. The image lens assembly of claim 20, wherein the curvature radius of the object-side urface of the second lens element is R3, the curvature radius of the image-side surface of the second lens element is R4, and the following condition is satisfied:

$$-1.10 \leq (R3+R4)/(R3-R4) < 0.90.$$

26. An image capturing device, comprising:
the image lens assembly of claim 20; and
an image sensor, wherein the image sensor is connected to the image lens assembly.

27. A mobile terminal, comprising:
the image capturing device of claim 26.

\* \* \* \* \*

UNITED STATES PATENT AND TRADEMARK OFFICE
CERTIFICATE OF CORRECTION

PATENT NO.        : 9,104,012 B2                           Page 1 of 1
APPLICATION NO.   : 14/084617
DATED             : August 11, 2015
INVENTOR(S)       : Hsiang-Chi Tang and Wei-Yu Chen It is certified that error appears in the above-identified patent and that said Letters Patent is hereby corrected as shown below:

In the claims

In column 27, line 48, Claim 1 of the issued patent reads as "50<f4/f2<0.90", but it should read as "0<f4/f2<0.90".

Signed and Sealed this
Ninth Day of February, 2016

Michelle K. Lee
*Director of the United States Patent and Trademark Office*